United States Patent
Bogan et al.

(10) Patent No.: US 11,507,206 B2
(45) Date of Patent: Nov. 22, 2022

(54) FORCE-SENSING INPUT DEVICE

(71) Applicant: Microsoft Technology Licensing, LLC, Redmond, WA (US)

(72) Inventors: Kelly Marie Bogan, Redmond, WA (US); Lincoln Matthew Ghioni, Redmond, WA (US); Anatoly Churikov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/410,775

(22) Filed: May 13, 2019

(65) Prior Publication Data

US 2020/0363880 A1 Nov. 19, 2020

(51) Int. Cl.
*G06F 3/0354* (2013.01)
*G06F 3/01* (2006.01)
*G06F 3/038* (2013.01)
*G06F 3/04842* (2022.01)
*G06F 3/0485* (2022.01)
*G06F 3/0487* (2013.01)

(52) U.S. Cl.
CPC .......... *G06F 3/03545* (2013.01); *G06F 3/016* (2013.01); *G06F 3/0383* (2013.01); *G06F 3/0485* (2013.01); *G06F 3/0487* (2013.01); *G06F 3/04842* (2013.01)

(58) Field of Classification Search
CPC .. G06F 3/03545; G06F 3/0485; G06F 3/0487; G06F 3/0383; G06F 3/016; G06F 3/04842; G06F 3/044
See application file for complete search history.

(56) References Cited

U.S. PATENT DOCUMENTS

| 4,659,873 A | 4/1987 | Gibson et al. |
| 4,803,103 A | 2/1989 | Pithouse et al. |
| 9,030,419 B1 * | 5/2015 | Freed ................... G06F 3/0488 345/173 |

(Continued)

FOREIGN PATENT DOCUMENTS

| FR | 3061567 A1 | 7/2018 |
| WO | 9854393 A1 | 12/1998 |

OTHER PUBLICATIONS

Song, et al., "Grips and Gestures on a Multi-Touch Pen", Retrieved from http://openexhibits.org/wp-content/uploads/papers/gripsandgestures%20mtpen-chi201.pdf, May 7, 2011, 10 Pages.

(Continued)

*Primary Examiner* — Patrick N Edouard
*Assistant Examiner* — Joseph P Fox
(74) *Attorney, Agent, or Firm* — Alleman Hall Creasman & Tuttle LLP

(57) ABSTRACT

Examples are disclosed that relate to touch-sensitive input devices, systems, and methods for providing user input to a computing device. In one example, a touch-sensitive input device comprises an elongated body and a plurality of force-sensing elements spaced along a length of the body. The touch-sensitive input device also comprises a wireless communication subsystem configured to communicatively couple the input device to the computing device and provide signals from the plurality of force-sensing elements to the computing device.

15 Claims, 19 Drawing Sheets

(56) References Cited

U.S. PATENT DOCUMENTS

| | | |
|---|---|---|
| 9,116,558 B2 | 8/2015 | Yilmaz et al. |
| 9,836,133 B2 | 12/2017 | Jiang et al. |
| 2006/0028456 A1* | 2/2006 | Kang ............... G06F 3/0312 345/179 |
| 2010/0053102 A1* | 3/2010 | Gelling ............ G06F 3/0485 715/833 |
| 2010/0235794 A1* | 9/2010 | Ording ............. G06F 3/0488 715/863 |
| 2011/0318985 A1 | 12/2011 | Mcdermid |
| 2012/0105358 A1* | 5/2012 | Momeyer ......... G06F 3/0485 345/174 |
| 2013/0300668 A1* | 11/2013 | Churikov .......... G06F 3/041 345/168 |
| 2014/0253305 A1* | 9/2014 | Rosenberg ........ G01L 1/22 340/407.2 |
| 2014/0253522 A1* | 9/2014 | Cueto .............. G06F 3/03545 345/179 |
| 2014/0267180 A1 | 9/2014 | Buelow et al. |
| 2015/0231000 A1 | 8/2015 | Uda |
| 2015/0363035 A1 | 12/2015 | Hinckley et al. |
| 2016/0021799 A1 | 1/2016 | Harris et al. |
| 2016/0179222 A1* | 6/2016 | Chang ............. G06F 3/0383 345/179 |
| 2016/0282970 A1 | 9/2016 | Evreinov et al. |
| 2016/0282988 A1 | 9/2016 | Poupyrev |
| 2017/0180988 A1* | 6/2017 | Kim ................ A61B 5/6887 |
| 2017/0270357 A1* | 9/2017 | Winebrand ....... G06K 9/00436 |
| 2018/0181222 A1 | 6/2018 | Ivanov |
| 2019/0113986 A1* | 4/2019 | Bikumala ......... G06F 3/0383 |
| 2020/0012358 A1* | 1/2020 | Marshall .......... G06F 3/03545 |
| 2020/0034032 A1* | 1/2020 | Tanabe ............ G06F 3/04845 |
| 2020/0270778 A1 | 8/2020 | Bogan et al. |

OTHER PUBLICATIONS

Hinckley, et al., "Sensing Techniques for Tablet+Stylus Interaction", In Proceedings of 27th Annual ACM Symposium on User Interface Software and Technology, Oct. 5, 2014, pp. 605-614.

"International Search Report and Written Opinion Issued in PCT Application No. PCT/US2020/017402", dated May 29, 2020, 11 Pages.

"International Search Report and Written Opinion Issued in PCT Application No. PCT/US20/027121", dated Aug. 18, 2020, 20 Pages.

"Non Final Office Action Issued in U.S. Appl. No. 16/285,033", dated May 24, 2022, 8 Pages.

* cited by examiner

FORCE-SENSING INPUT DEVICE

BACKGROUND

A variety of input devices, such as smart pens, styluses, and handheld controllers, may be used to provide input to computing devices. Some handheld input devices include buttons or other physical input mechanisms that enable users to provide simple user inputs. However, such devices may not allow users to provide varying or more complex gesture inputs and may have limited locations at which inputs may be received.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to touch-sensitive input devices, systems, and methods for providing user input to a computing device. In one example, a touch-sensitive input device comprises an elongated body and a plurality of force-sensing elements spaced along a length of the body. The touch-sensitive input device also comprises a wireless communication subsystem that is configured to communicatively couple the input device to the computing device and provide signals from the plurality of force-sensing elements to the computing device.

Another example provides a system comprising a computing device and a touch-sensitive input device configured to be communicatively coupled to the computing device. The computing device comprises a touch-sensitive display, a processor, and a memory storing instructions executable by the processor to display content via the touch-sensitive display. The touch-sensitive input device comprises an elongated body and a plurality of force-sensing elements spaced along a length of the body. The touch-sensitive input device also comprises a wireless communication subsystem that is configured to communicatively couple the input device to the computing device and provide signals from the plurality of force-sensing elements to the computing device.

Another example provides, at a touch-sensitive user input device comprising an elongated body, a method for providing user input to a computing device communicatively coupled to the touch-sensitive user input device. The method comprises receiving signals from a plurality of force-sensing elements that are spaced along a length of the body. The method also comprises determining that the signals correspond to a user input event and communicating the signals to the computing device.

DETAILED DESCRIPTION

A variety of input devices, such as smart pens, styluses, and handheld controllers, may be used to provide input to computing devices. For example, a smart pen may be used to provide input to a tablet computing device via a touchscreen display. In another example, a handheld controller may be used to provide input to a head-mounted display (HMD) device.

Some handheld input devices may include one or more physical input mechanisms, such as buttons or scroll wheels, that enable users to provide simple user inputs. However, such devices may not allow users to provide varying or more complex inputs. Further, while such devices may accept inputs at the one or more physical input mechanisms, these devices may not allow users to provide inputs at other desired locations on a device.

Accordingly, examples are disclosed that relate to touch-sensitive input devices, systems, and methods for providing user input to a computing device using a plurality of force-sensing elements spaced along a body of an input device. Signals received from one or more of the force-sensing elements may be provided as inputs to the computing device. In this manner, a wide range of user inputs corresponding to different functions may be provided at any desirable location on the body of the input device. In some examples, this may enable developers to create new interaction modalities and experiences with software, make applications easier to navigate, improve a user's productivity, and replace physical buttons or other input mechanisms on the input device.

The following use case examples disclose one example of a touch-sensitive input device in the form of an electronic pen. It will be appreciated that the principles of the present disclosure may be utilized with many other examples of touch-sensitive input devices including, but not limited to, handheld controllers and other configurations of electronic pens and styluses.

Figure 1:
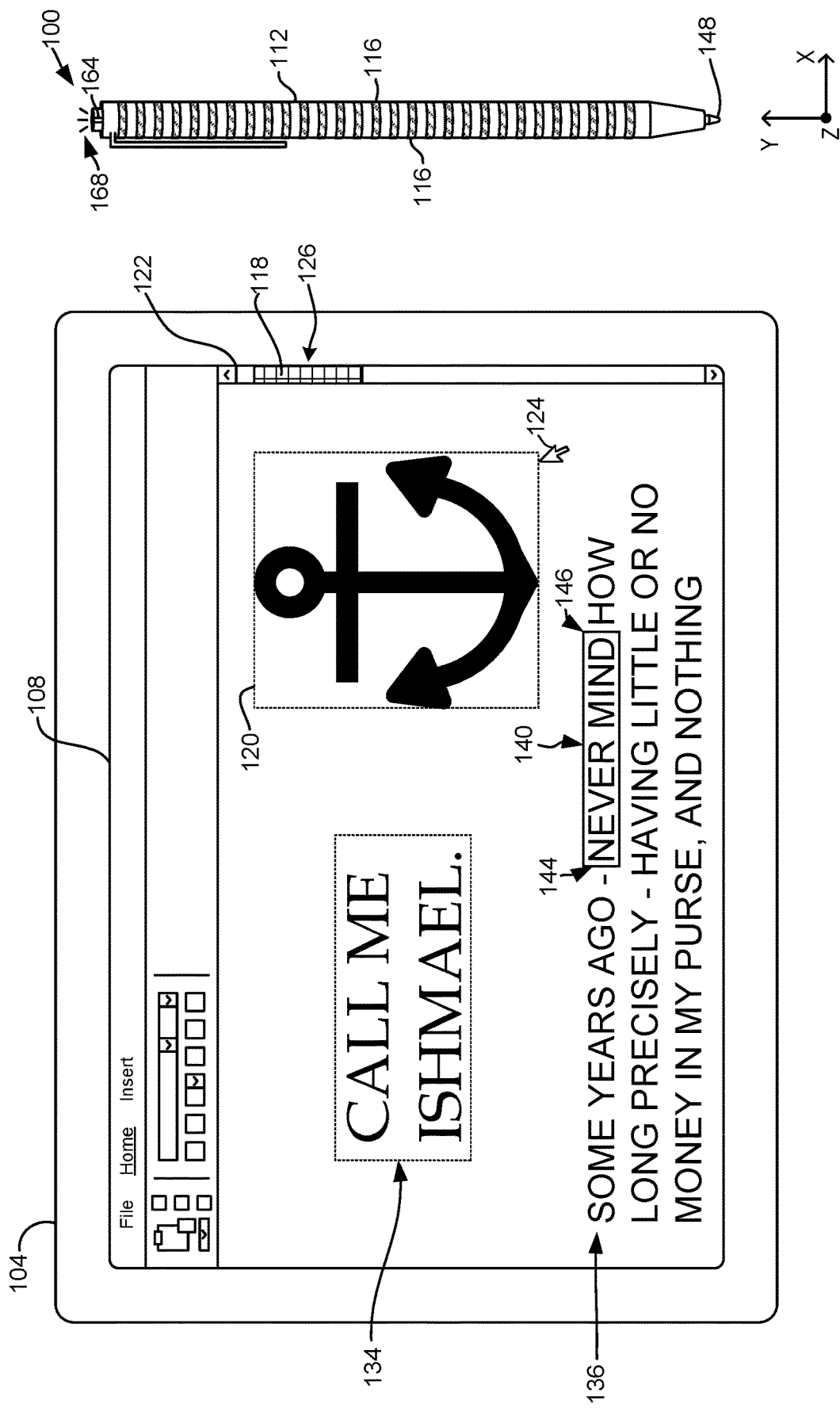
FIG. 1 shows an example of a touch-sensitive input device configured to be communicatively coupled to a computing device comprising a touch-sensitive display according to examples of the present disclosure.

FIG. 1 shows one example of a touch-sensitive input device, illustrated in the form of an electronic pen 100. As illustrated by example in FIG. 1, the electronic pen 100 comprises an elongated body 112. The electronic pen 100 may be used to provide input to a computing device, depicted in the example of FIG. 1 as a tablet computing device 104 comprising a touch-sensitive display 108. For example, the electronic pen 100 may be used as a stylus to provide tactile inputs to the tablet computing device via the touch-sensitive display 108.

The electronic pen 100 also comprises touch-sensing functionality that may enable users to provide touch and gesture-based inputs to the computing device 104. As illustrated by example in FIG. 1, the electronic pen 100 comprises a plurality of force-sensing elements 116 spaced along a length of the body 112. In some examples, the force-sensing elements 116 may comprise force-sensing resistor elements. In these examples, each of the plurality of force-sensing elements 116 may comprise a material that changes its electrical resistance when a force, pressure or mechanical stress is applied. Examples of such materials may include conductive polymers and inks. The change in this material's resistance may be measured as a signal and interpreted as a user input, such as a click or gesture.

In other examples, the force-sensing elements 116 may comprise force-sensing capacitive elements. For example, each of the force-sensing elements 116 may comprise a force-sensing capacitive sensor having an insulator, such as a foam layer, on top of the sensor.

The force-sensing elements 116 may provide higher-resolution user input than other types of sensing elements, such as capacitive touch sensors. For example, where an electronic pen or stylus includes capacitive touch sensors, when a user holds or grips the pen at the same time as touch input is provided with a fingertip, the unintended signals generated by the user's grip can obscure the input signals provided by the fingertip.

As described in more detail below regarding FIG. 19, the electronic pen 100 also comprises a wireless communication subsystem that is configured to communicatively couple the pen to the computing device 104. For example, the electronic pen 100 and the computing device 104 may be communicatively coupled via Bluetooth or any other suitable wireless network. In this manner, the wireless communication subsystem provides signals from the plurality of force-sensing elements 116 to the computing device 104, which may process the signals as user inputs as described in more detail below. In other examples, the electronic pen may at least partially process signals from the force-sensing elements 116 using one or more of the techniques and processes described herein.

In the example of FIG. 1, each of the plurality of force-sensing elements 116 comprises a circular force-sensing element that extends entirely around a circumference of the cylindrical body 112 of the electronic pen 100. Each of the plurality of force-sensing elements 116 are spaced uniformly apart along the body 112. For example, the force-sensing elements 116 may be spaced apart by a gap of 2-3 mm along the y-axis.

Signals provided by each of the plurality of force-sensing elements 116 may indicate a one-dimensional position along the body 112 at which a force is applied. For example, the signals provided by each of the circular force-sensing elements 116 may indicate a position of the force along the y-axis of the body 112, regardless of where around the circumference of the body 112 the force is applied.

Figure 2:
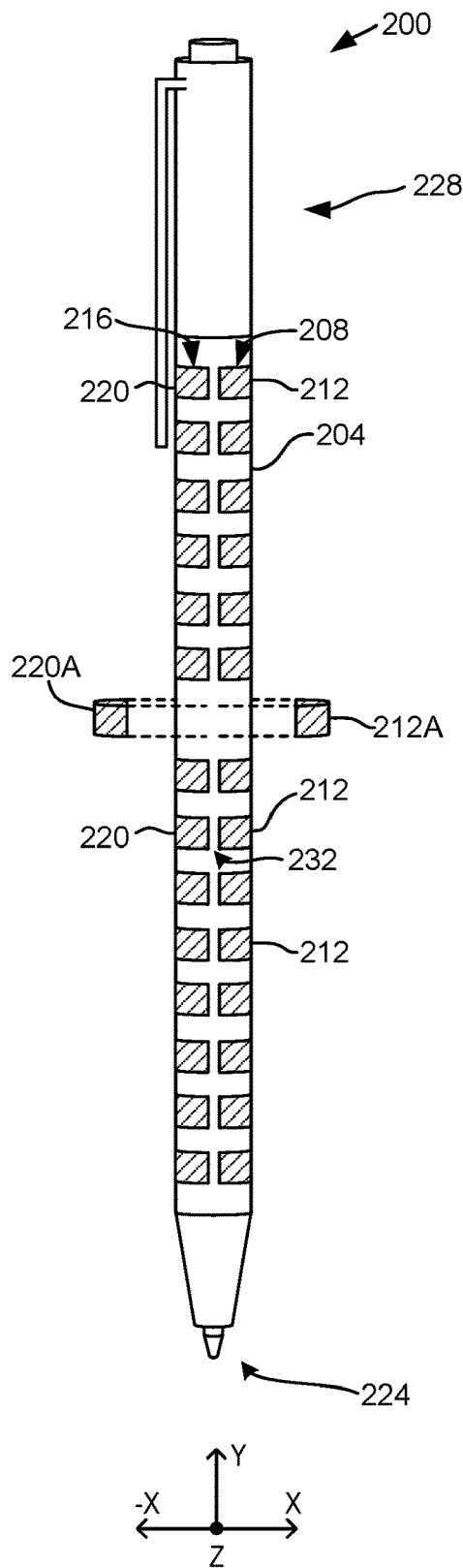
FIG. 2 shows another example of a touch-sensitive input device according to examples of the present disclosure.

In other examples, the force-sensing elements may have any other suitable shapes and/or be arranged in any other suitable pattern. FIG. 2 shows another example of a touch-sensitive input device in the form of an electronic pen 200. Like the electronic pen 100 illustrated in the example of FIG. 1, the electronic pen 200 comprises an elongated body 204. A first row 208 of a plurality of force-sensing elements 212 is provided along one side of the body 204. A second row 216 of a plurality of force-sensing elements 220 is provided along another side of the body 204 opposite the first row 208. Like the example of FIG. 1, the plurality of force-sensing elements 212 and 220 may be uniformly spaced along the length of the body 204 of the electronic pen 200. For example, each of the force-sensing elements in a given row may be separated by a gap of 2-3 mm along the y-axis. In this example, the force-sensing elements 212, 220 are located along substantially the entire length of the pen 100. In other examples, such as the example shown in FIG. 6, force-sensing elements may be located in one or more portions of the entire length of a pen.

As illustrated by example in FIG. 2, each of the plurality of force-sensing elements 212 and 220 may comprise a semi-circular force-sensing element wrapped around a portion of the body 204. In some examples, two or more of the force-sensing elements may be aligned to extend around coplanar portions of a circumference of the body 204. For example, FIG. 2 shows an exploded view of one force-sensing element 212A and a second force-sensing element 220A, which are both aligned to have the same y-axis coordinates.

Figure 3:
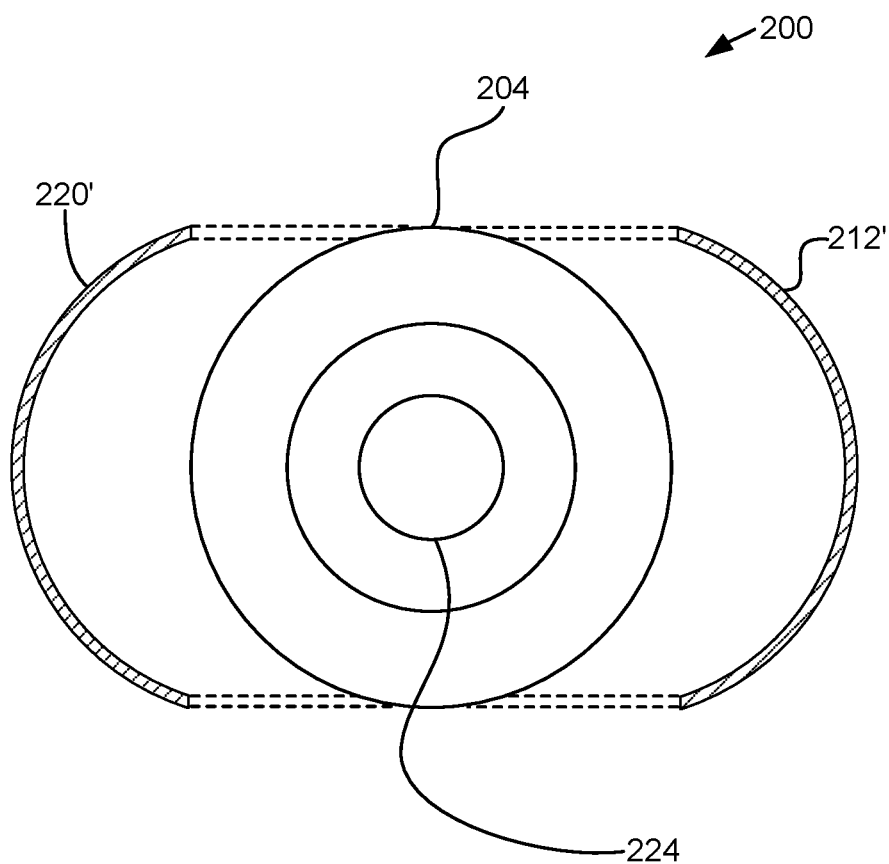
FIG. 3 shows an end view of the touch-sensitive input device of FIG. 2.

FIG. 3 shows an end view of the electronic pen 200 as viewed from a tip portion 224 of the device looking towards a tail portion 228 of the device, in the direction of the positive y-axis. FIG. 3 also depicts an exploded view of the two force-sensing elements 212A and 220A. As shown in FIGS. 2-3, the force-sensing elements are semi-circular, with an inner topology (facing the body 204) that may conform to a contour of the body 204. For example, each of the force-sensing elements 212 and 220 may comprise a flexible material that is flexed to fit adjacent to a surface of the body 204.

In the example of FIGS. 2-3 the force-sensing element 220A is located on an opposite side of the body 204 from the force-sensing element 212A, and the force-sensing elements have mirror symmetry about the body 204. For example, each force-sensing element 212 in the first row 208 may be positioned within the positive x-axis domain, and each force-sensing element 220 in the second row 216 may be positioned within the negative x-axis domain. In this example and with reference to FIG. 2, the electronic pen 200 includes a gap 232 along the x-axis that separates each positive x-axis force-sensing element 212 from its opposing negative x-axis force-sensing element 220. In some examples these gaps can be staggered or rotated uniformly such that no one continuous line in the y-axis direction is without sensors. In this manner, signals provided by one or more of the force-sensing elements 212 and 220 may indicate a position at which a force is applied along both the positive y-axis of the body 204 and along the positive or negative x-axis.

Figure 4:
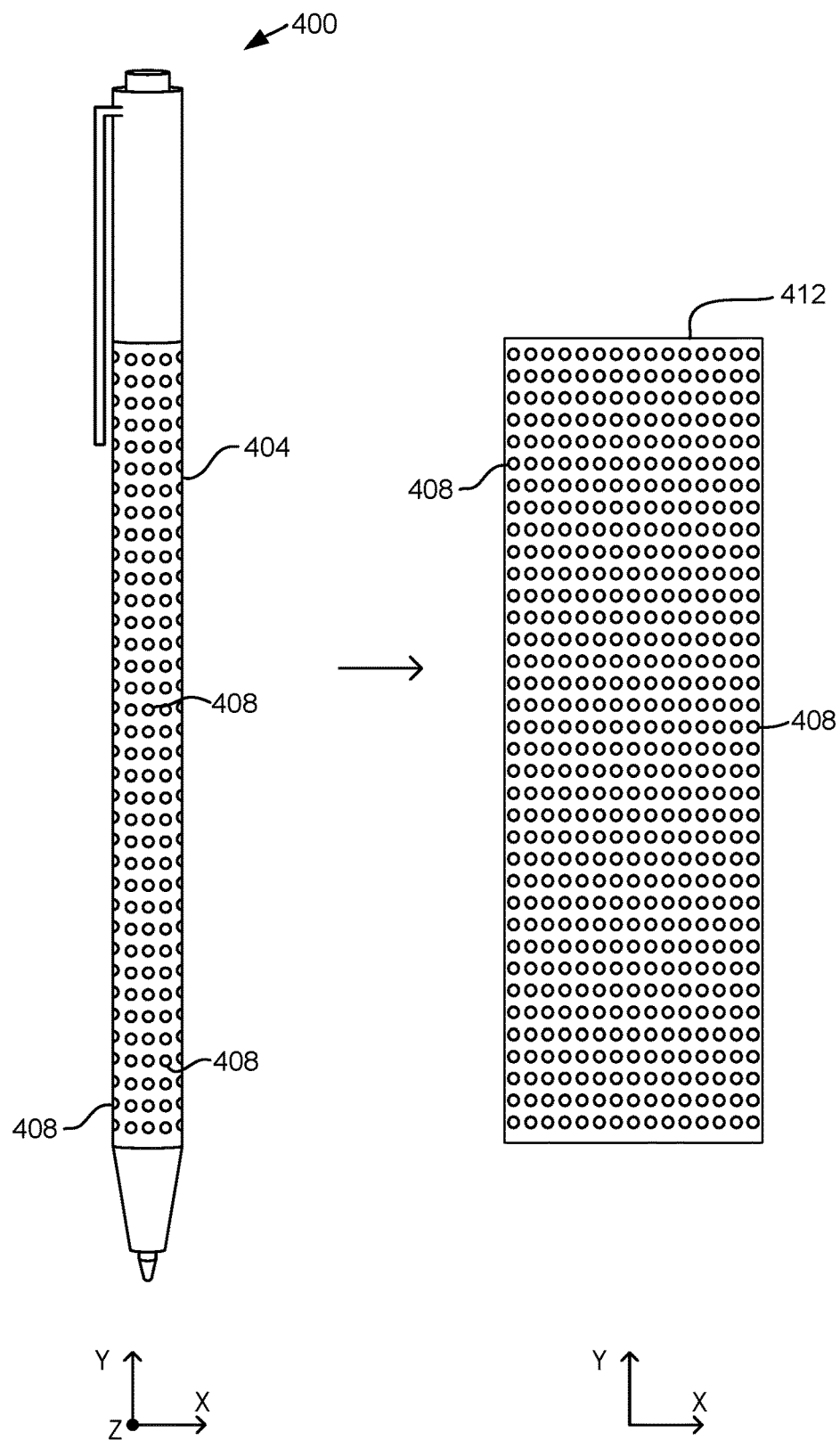
FIG. 4 illustrates another example of a touch-sensitive input device according to examples of the present disclosure.

In other examples, a plurality of individual force-sensing elements may be distributed in an array around both the circumference and length of the body. FIG. 4 illustrates another example of a touch-sensitive input device. In the example of FIG. 4, the touch-sensitive input device also takes the form of an electronic pen 400 having an elongated body 404.

In the example of FIG. 4, a plurality of force-sensing elements 408 are spaced around a circumference and along a length of the body 404. Each force-sensing element 408 may take the form of a circular force-sensing element, with the plurality of elements arranged in a uniformly-spaced rectangular grid. Each of the circular force-sensing elements may have a diameter of 2-3 mm and may be spaced 2-3 mm apart. In other examples, the plurality of force-sensing elements 408 may take any other suitable shapes, such as square, oblong, etc. In other examples, the plurality of force-sensing elements 408 may be arranged into any other suitable pattern or sub-patterns, such as a plurality of circular or hexagonal sub-patterns, and with any other suitable spacings.

In one potential advantage of the electronic pen 400 of FIG. 4, using an array of force-sensing sensors may enable a precise position in at least two dimensions to be determined for any force applied to the body of the device. In some examples, each of the plurality of force-sensing elements 408 may be treated as corresponding to a position within a two-dimensional grid 412, which may represent the array of force-sensing elements 408 as if it was unwrapped from around the circumference of the body 404. In other examples, when a force is applied to any one of the force-sensing elements 408, signals from that force-sensing element 408 may be identified with a known three-dimensional position of that force-sensing element 408 relative to a reference point (e.g. a center or a tip portion of the touch-sensitive input device 400). In this manner, signals provided by one or more of the plurality of force-sensing elements 408 may indicate a precise location of force inputs, which may enable the touch-sensitive input device 400 to sense multi-dimensional touch and gesture inputs.

As described in more detail below, user inputs provided via force-sensing elements may be used to control a variety of functions on the touch-sensitive input device or on an associated computing device. For example, inputs provided via the force-sensing elements may be used to turn the input device on or off, move or scroll content displayed by the computing device, select, highlight, copy or paste content, or recognize a user based on the user's grip on the touch-sensitive input device.

As one example, the electronic pen 100 may be used to provide a binary input, such as a click or a single selection event. As described in more detail below, a binary input event may be defined as the pressure at one or more force-sensing elements exceeding an event initiation threshold. The input may be transmitted to the computing device 104 and used to modify content displayed via the touch-sensitive display 108. For example and with reference to FIG. 1, the computing device 104 may process the binary input as a click to select a portion of the content, such as clip art 120, displayed at a location of a cursor 124 on the touch-sensitive display 108.

Figure 5:
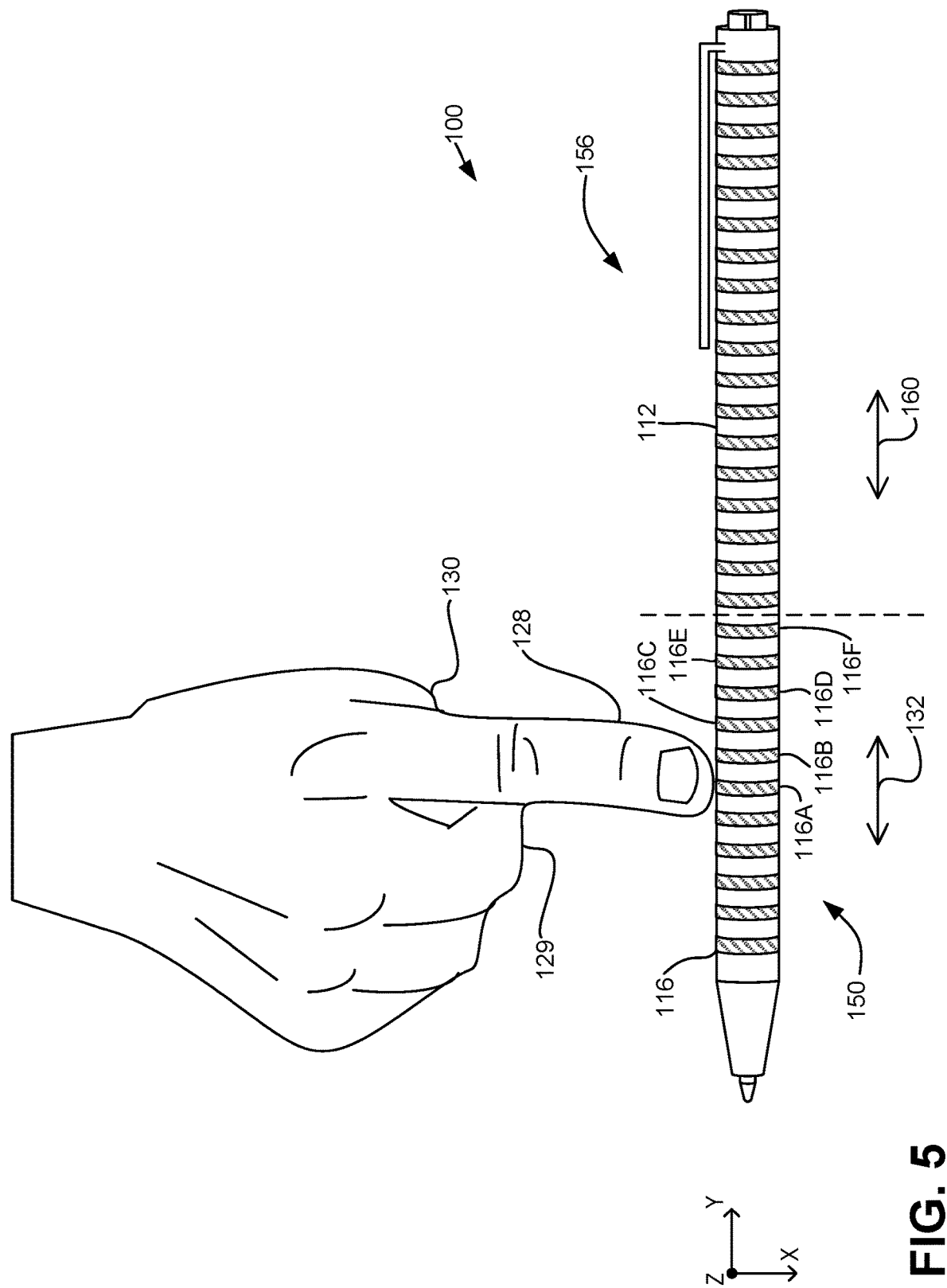
FIG. 5 illustrates one example of a user providing input at the touch-sensitive input device of FIG. 1.

FIG. 5 illustrates one example of a user providing input at the electronic pen 100 of FIG. 1. In this example, the user may apply pressure to the electronic pen 100 using a finger 128 to provide a binary input. In another example, illustrated in FIG. 6, the user may grip the pen 100 between fingers 128 and 129 and thumb 130 and squeeze the pen between the fingers and the thumb to provide the binary input. It will also be appreciated that the applied pressure may be used to provide a variety of other functionalities, including providing non-binary and sequential inputs as described in more detail below.

Figure 7:
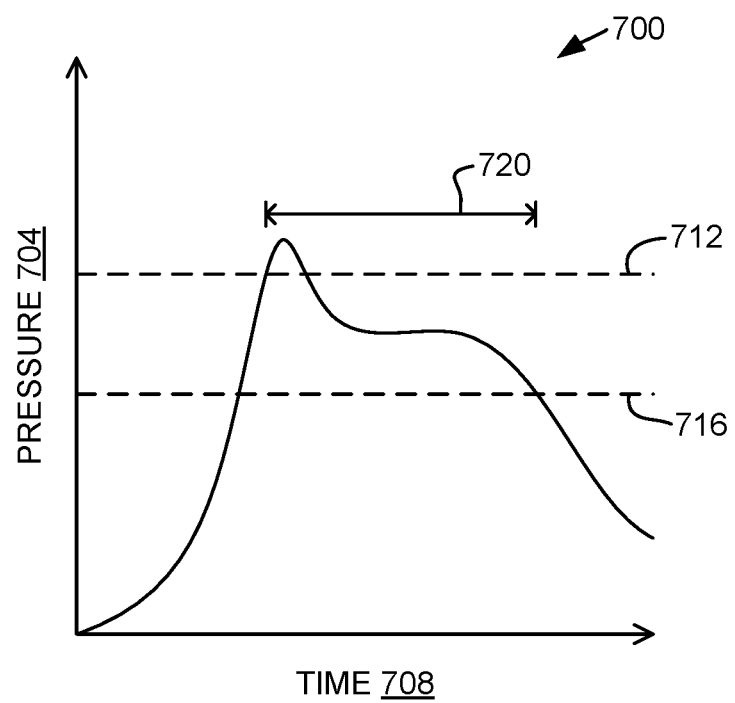
FIG. 7 shows a graph of pressure applied to a force-sensing resistor element according to examples of the present disclosure.

The signals provided from one or more of the plurality of force-sensing elements 116 on the electronic pen 100 may be received and monitored by the computing device 104 and/or pen to detect amounts and levels of pressure applied by the user. FIG. 7 shows a graph 700 of pressure 704 applied to one of the force-sensing elements 116 over time 708. An input event may be initiated when the pressure 704 exceeds an event initiation threshold 712. For example, the click event used to select the clip art 120 of FIG. 1 may be initiated when the pressure applied by one or more of the user's fingers 128 and 129 and thumb 130 exceeds an event initiation threshold for the click event. The input event may be terminated when the pressure drops below the event initiation threshold at a time after the event has been initiated. In other examples, the input event may be terminated when the pressure 704 drops beneath an event termination threshold 716 that is less than the event initiation threshold 712.

As illustrated in FIG. 7, the user may maintain pressure on the force-sensing element for a hold interval 720. In some examples, the hold interval 720 may be relatively short (e.g. 50 milliseconds), such as when making a fast click or tap. In other examples, the hold interval 720 may last for any desirable length of time, such as when clicking and dragging displayed content, which may last for over 1 second. In some examples, the hold interval 720 may be used to differentiate between different types of inputs and to determine which input the user intends to provide. In this manner, the touch-sensitive input device may be used to provide a variety of inputs with a user experience that may be similar to using a physical button or a mouse.

Figure 8:
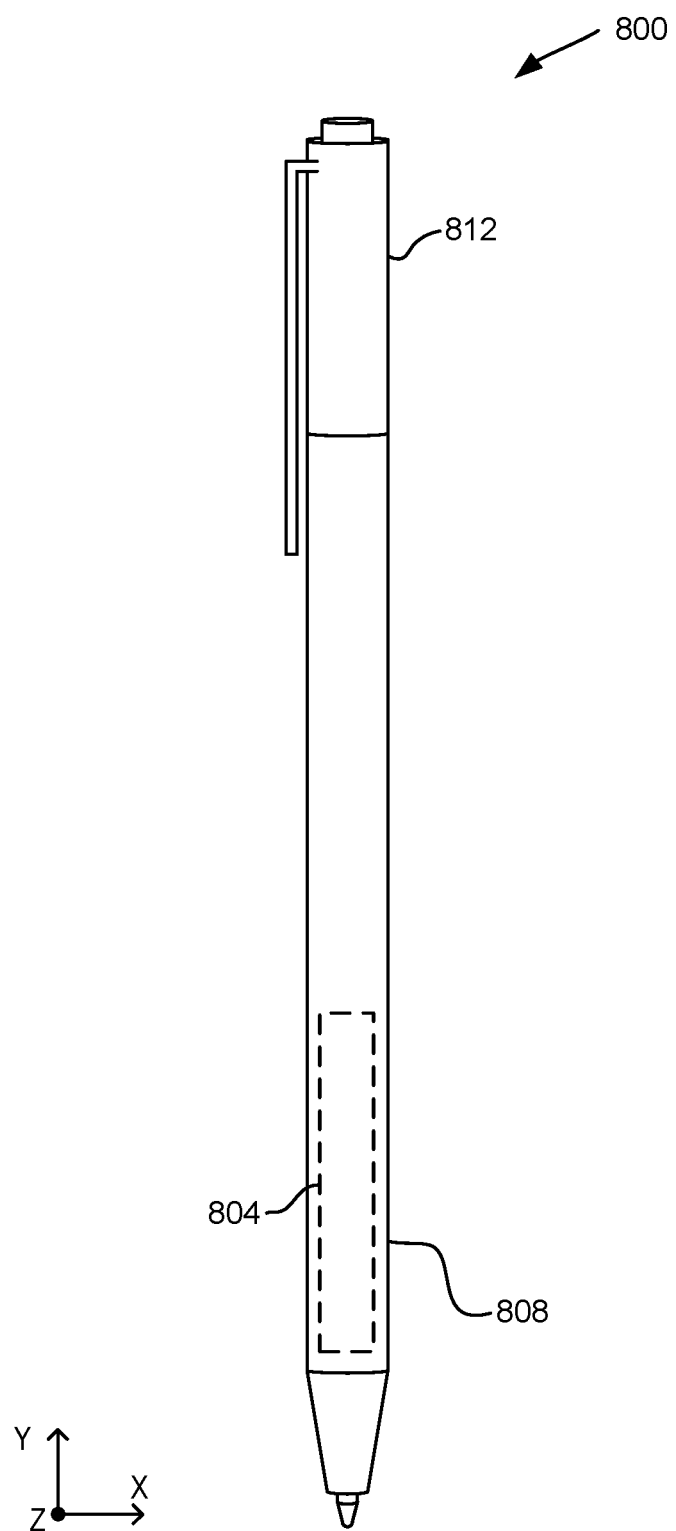
FIG. 8 shows an example of a touch-sensitive input device comprising an actuator for providing haptic feedback according to examples of the present disclosure.

One distinction between touch-sensitive surfaces and physical buttons is that touch-sensitive surfaces may not provide the user with tactile feedback associated with actuating a physical mechanism. Accordingly, in some examples, the touch-sensitive input device of the present disclosure may include an actuator for providing haptic feedback to the user. FIG. 8 shows one example of a touch-sensitive electronic pen 800 comprising an actuator 804, such as a linear resonant actuator, for providing haptic feedback. The pen 800 may comprise a plurality of force-sensing elements (not shown for clarity) in the configuration shown in FIG. 1, 2, or 4, or any other suitable configuration. As illustrated in FIG. 8, the actuator 804 may be located inside the pen 800 in a grip portion 808 of the pen. In other examples, the actuator 804 may be located in any other suitable portion of the touch-sensitive input device 800, such as a tail portion 812. In some examples, two or more actuators may be located in different portions of the pen 800. In this manner, the touch-sensitive input device 800 may provide haptic feedback to the user.

For example, and with reference again to FIG. 7, the haptic feedback actuator may be activated when the pressure 704 exceeds the event initiation threshold 712 and/or when the pressure 704 drops beneath the event termination threshold 716. Accordingly, and in one potential advantage of the present disclosure, the touch-sensitive input device may provide haptic feedback when users provide input, replacing sensations associated with actuating a mechanical button.

In other examples, the user may use the touch-sensitive input device to provide sequential input that modifies displayed content or controls other functionality. For example, and with reference again to FIG. 5, the user may use finger 128 to press on the electronic pen 100 and slide the finger 128 up or down at least a portion of the length of the electronic pen 100 to make a sliding gesture 132. In some examples the gesture 132 may be interpreted as a command to scroll content displayed via the touch-sensitive display. Similarly and with reference to FIG. 6, the user may press the tip 135 of her finger 128 against the force-sensing elements 116 and slide her finger up or down at least a portion of the length of the electronic pen 100 to make a sliding gesture 137. Such a gesture 137 also may be interpreted as a command to scroll content displayed via display.

Figure 9:
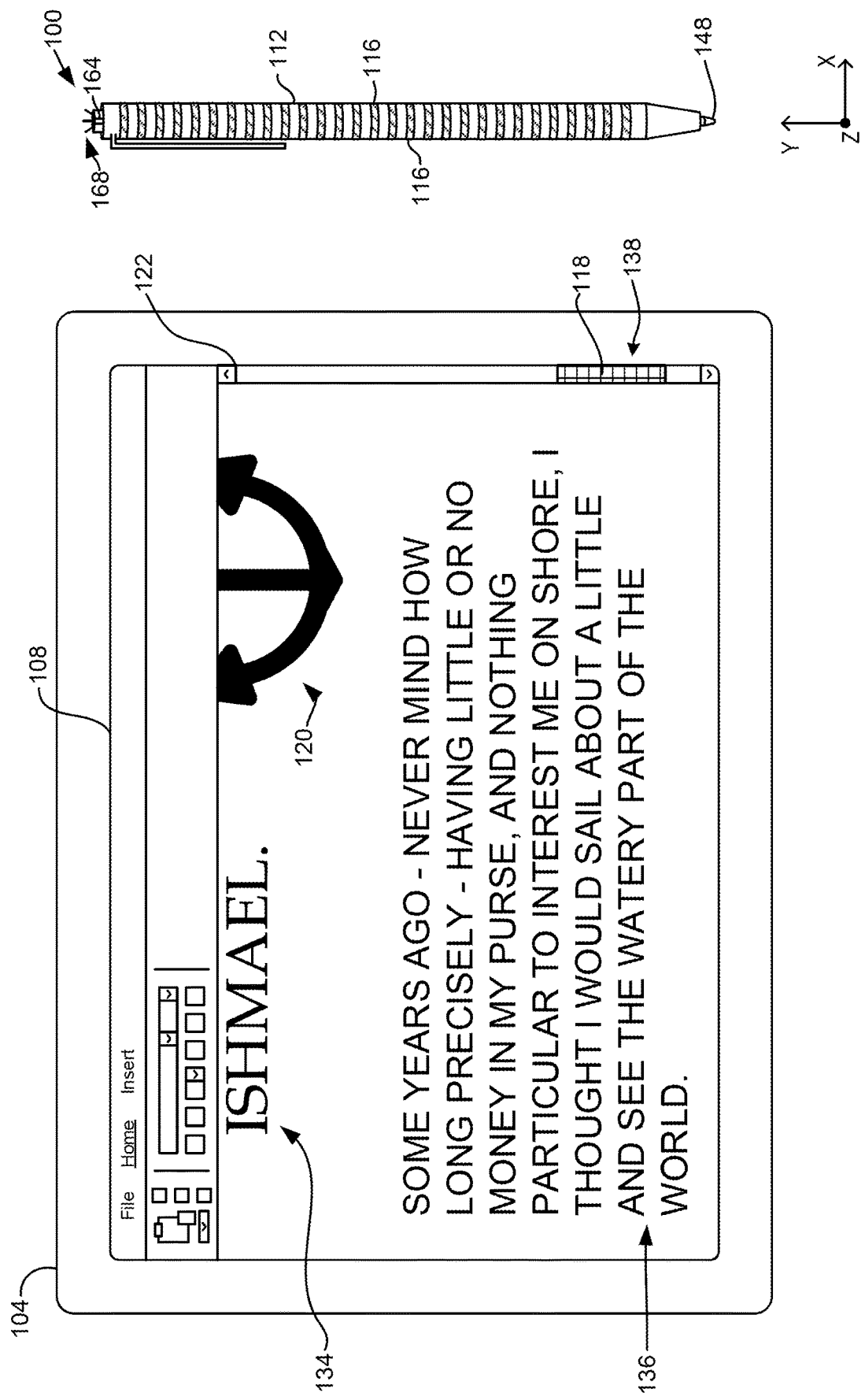
FIG. 9 illustrates one example of scrolling content displayed via the touch-sensitive display of FIG. 1.

FIG. 9 shows one example of scrolling content displayed via the touch-sensitive display 108 of FIG. 1. In FIGS. 1 and 9, the content displayed via the touch-sensitive display 108 includes a scroll bar 122. As shown in FIG. 1, a scroll indicator 118 of the scroll bar 122 is in an upper position 126, indicating that the touch-sensitive display 108 is displaying an upper portion of the content, which includes the clip art 120 and a title box 134. In FIG. 9, the scroll indicator 118 is in a lower position 138, indicating that the touch-sensitive display 108 is displaying a lower portion of the content. For example, in FIG. 9, an upper portion of the clip art 120 and the title box 134 are not visible, while additional lines of text 136 are shown that were not visible in FIG. 1.

Figure 10A:
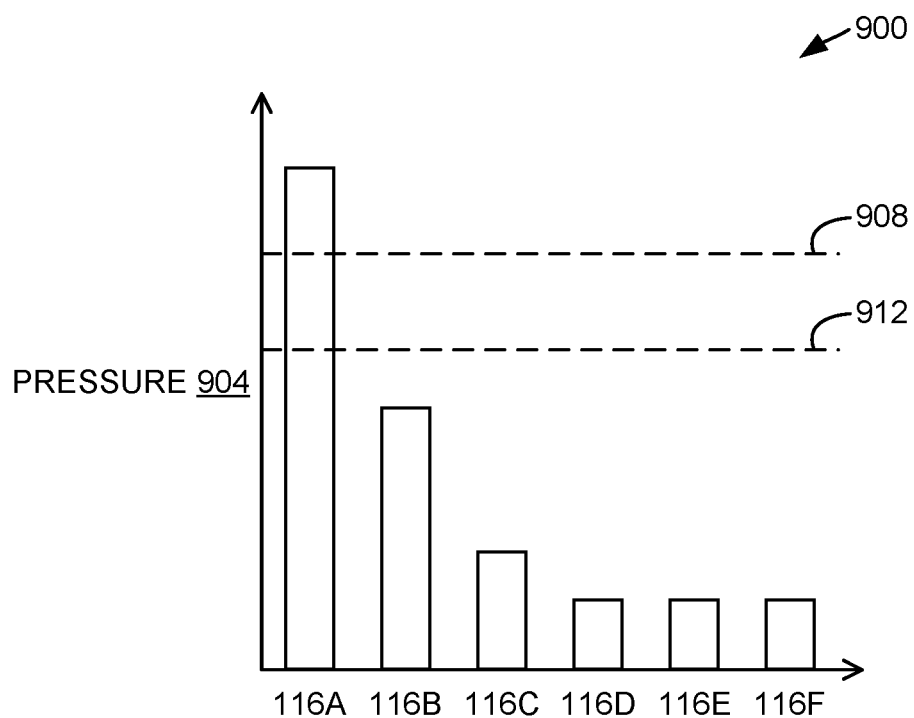
FIGS. 10A and 10B show two graphs of pressure applied to each of a portion of force-sensing elements during an example scrolling event.

In one example of a scrolling event, FIG. 10A shows a graph 900 of pressure 904 applied to each of a portion of the force-sensing elements 116 at a sample time during the scrolling event. In this example, the portion of the force-sensing elements 116 comprises force-sensing elements 116A, 116B, 116C, 116D, 116E, and 116F from the example of FIG. 5. As described above regarding FIG. 7, an input event may be initiated when the pressure 904 exceeds an event initiation threshold 908. For example, a scrolling event may be initiated when the pressure 904 applied to the force-sensing element 116A exceeds the event initiation threshold 908.

Figure 10B:
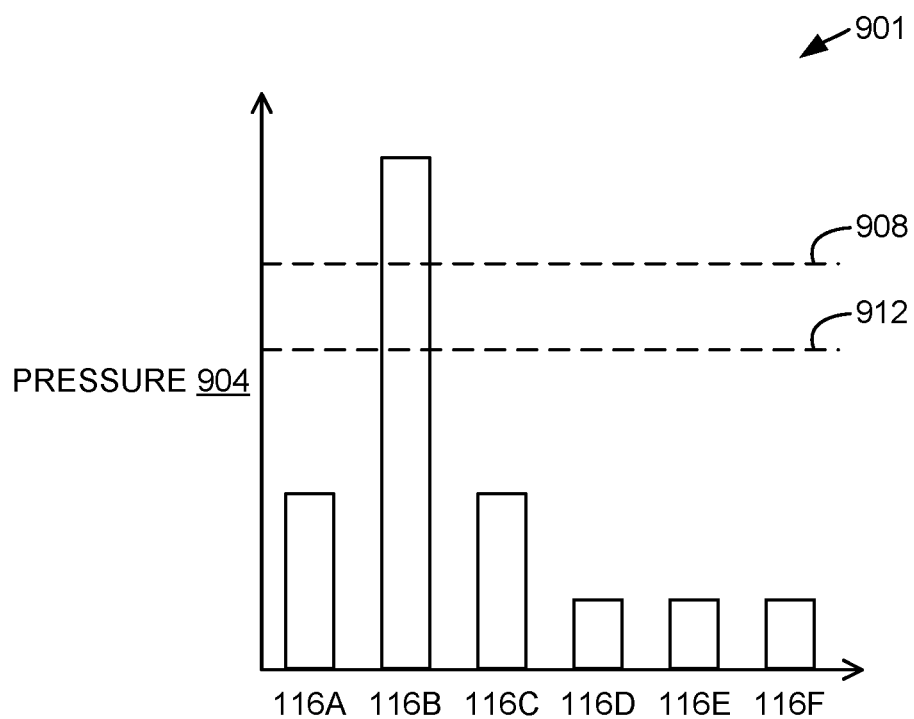

In some examples and as described below, signals from adjacent force-sensing elements may be analyzed to determine that an input event, such as a scrolling event, has occurred. For example, a signal may be received from force-sensing element 116A and used determine that an initial pressure applied to the force-sensing element 116A exceeds the event initiation threshold 908. With reference now to the graph 901 shown in FIG. 10B, subsequently a signal is received from neighboring force-sensing element 116B adjacent to force-sensing element 116A and used to determine that a neighboring pressure applied to the neighboring force-sensing element 116B now exceeds the event initiation threshold. At the same time, a signal from the force-sensing element 116A is used to determine that a subsequent pressure applied to the force-sensing element 116A is below the event termination threshold 912. Accordingly, and based on (1) determining that the neighboring pressure applied to the neighboring force-sensing element 116B exceeds the event initiation threshold and (2) determining that the subsequent pressure applied to the force-sensing element 116A is below the event termination threshold, content displayed by the touch-sensitive display is modified, such as by scrolling the content.

The pressure applied over time to individual force-sensing elements 116 of the portion of the force-sensing elements may also indicate a direction and duration of the scrolling event. For example, and with reference again to FIG. 5, the user may scroll by sliding the finger 128 along the body 112 of the pen 100 in the direction of the positive y-axis. Accordingly, as the finger 128 and exerted pressure move from one force-sensing element to the adjacent force-sensing element, the sequential increasing of pressure at neighboring force-sensing elements may be utilized to determine the direction of the scrolling event, and the content displayed by the touch-sensitive display may be correspondingly modified.

In the present example and with reference again to FIGS. 10A and 10B, as the user's finger 128 moves from the force-sensing element 116A to the neighboring force-sensing element 116B, the pressure applied to the neighboring force-sensing element 116B may exceed the event initiation threshold 908, and the pressure applied to the force-sensing element 116A may drop below the event termination threshold 912. In this manner, the changing pressure applied to these force-sensing elements over time indicates that the user has executed a scrolling event from the force-sensing element 116A to neighboring force-sensing element 116B; i.e., in the positive y-axis direction.

In some examples, a scrolling event or other user input event may be determined to occur or to continue when the pressure applied to neighboring force-sensing elements changes within a predefined period of time, such as 500 milliseconds or other suitable timeframe. In other words and with reference again to FIG. 10B, the pen 100 or computing device 104 may determine that a scrolling event has occurred based on both (1) determining that the neighboring pressure applied to the neighboring force-sensing element 116B exceeds the event initiation threshold, and (2) determining that the subsequent pressure applied to the force-sensing element 116A is below the event termination threshold, and that (1) and (2) happened within the predefined period of time. In this manner, a sliding gesture on the pen body may be differentiated from other gestures or contacts with the pen body.

In some examples, each scrolling event that occurs within the predefined period of time from a previous user input event may be interpreted as a continuation of a previous event. For example, once a scrolling event or portion thereof is detected (e.g. between force-sensing elements 116A and 116B as described above), each new crossing between adjacent force-sensing elements (e.g. force-sensing elements 116B and 116C) that exhibits the pressure changes associated with a scrolling event and that occurs within the predefined period of time may be interpreted as another scrolling event.

Where a new crossing between adjacent force-sensing elements happens beyond the predefined period of time, the pressure applied to each of the force-sensing elements may be interpreted as a different type of user input, such as an individual click event.

In some examples, scrolling or other functionality may be terminated when the pressure applied to all force-sensing elements 116 falls below the event termination threshold 912. In other examples, scrolling or other functionality may be terminated when the pressure applied to force-sensing elements 116 that are adjacent to or within a predetermined range of a designated force-sensing element(s) falls below the event termination threshold 912 for a period of time exceeding a termination timeframe. For example and with reference again to FIG. 10B, where the user continually presses her finger on force-sensing element 116B for a period of time exceeding an example termination timeframe of 1 second, such that the pressure on neighboring force-sensing elements 116A and 116C stays below the event termination threshold 912 for longer than 1 second, the scrolling or other functionality may be terminated.

In some examples, a haptic actuator may provide feedback to users to indicate one or more aspects of a scrolling event. For example, the touch-sensitive input device may fire the actuator at the start and end of a series of scrolling events. In some examples, the haptic actuator may also be controlled to provide subtle feedback each time the user's finger crosses one of the force-sensing elements.

Figure 6:
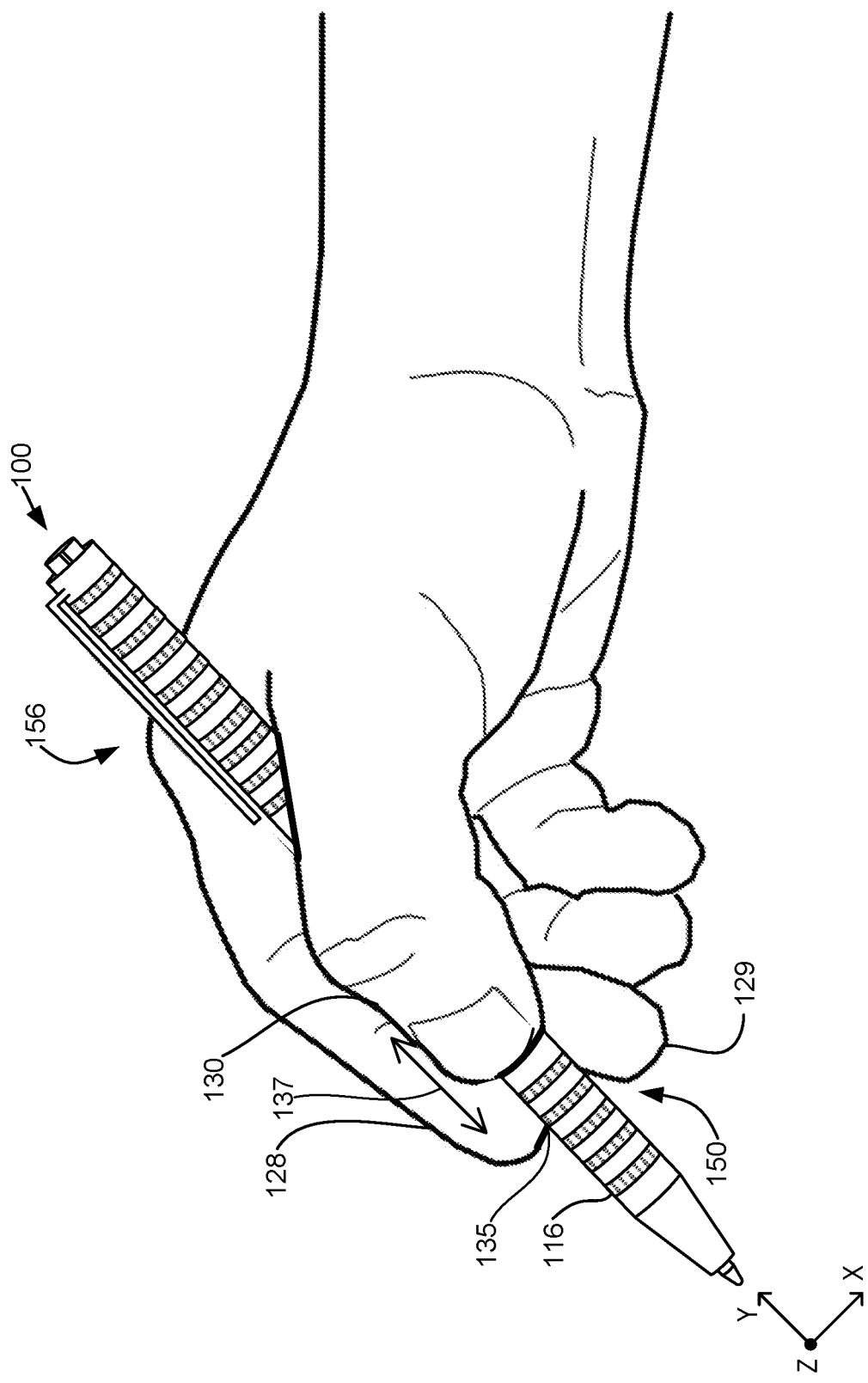
FIG. 6 illustrates another example of a user providing input at the touch-sensitive input device of FIG. 1.

With reference again to the example of FIG. 6, in some examples the user may be pressing on the electronic pen 100 with more than one digit/finger and/or may be pressing on multiple force-sensing elements 116 with one finger. In these examples, the user may inadvertently apply pressure in excess of an event initiation threshold while gripping the device. Accordingly, in some examples the electronic pen 100 or computing device 104 may set the event initiation threshold based on an initial pressure exerted on a portion of the plurality of force-sensing elements. In some examples, adjusting the event initiation threshold pressure in this manner may better accommodate users with tighter grips.

Figure 11A:
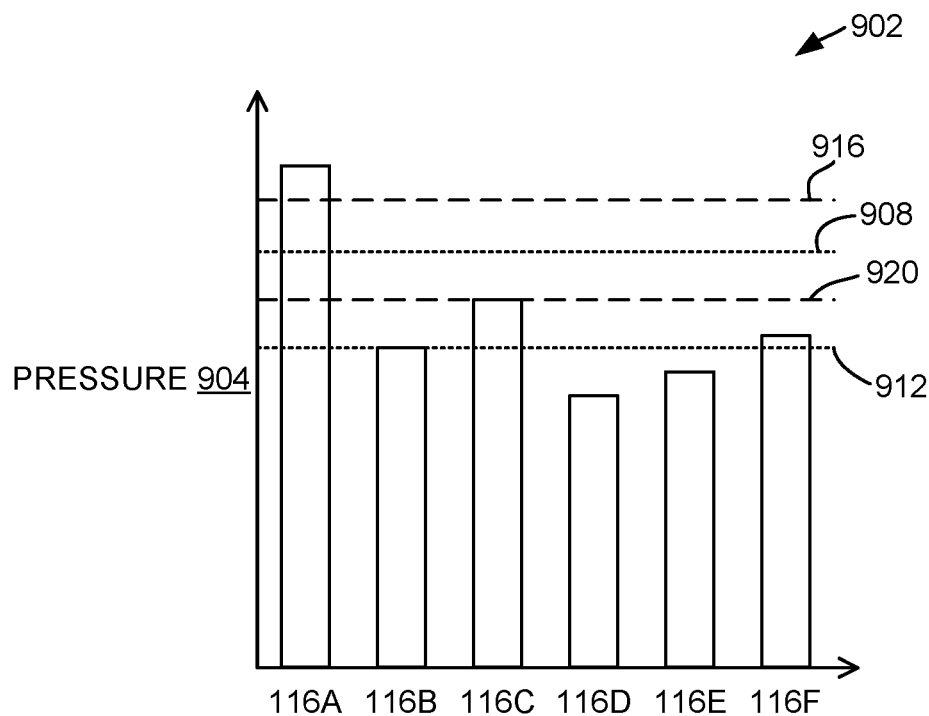
FIGS. 11A and 11B show another two graphs of pressure applied to each of the portion of the force-sensing elements of FIGS. 10A and 10B during another example scrolling event.

FIG. 11A illustrates another graph 902 of the pressure 904 applied to force-sensing elements 116A, 116B, 116C, 116D, 116E, and 116F, which are underneath the thumb 130 in the example of FIG. 6. As described above regarding FIG. 10A, a scrolling event may be initiated when the pressure 904 applied to the force-sensing element 116A exceeds the event initiation threshold 908. However, as illustrated in FIG. 11A, pressure 904 exerted on the force-sensing elements 116B, 116C, 116D, 116E, and 116F may be relatively close to the event initiation threshold 908. To prevent unintentional input events from occurring, the event initiation threshold 908 may be adjusted to set a new event initiation threshold 916 based on the initial pressure exerted on force-sensing elements 116A, 116B, 116C, 116D, 116E, and 116F.

For example, initial pressure measurements may be taken for force-sensing elements 116A, 116B, 116C, 116D, 116E, and 116F, and used to compute an average initial pressure value. The average initial pressure value may be added to the original event initiation threshold 908, or input into a function, to output the new event initiation threshold 916. In this manner, pressure peaks may still trigger user input events as intended by the user, and the adjusted event initiation threshold may prevent unintended user inputs.

Figure 11B:
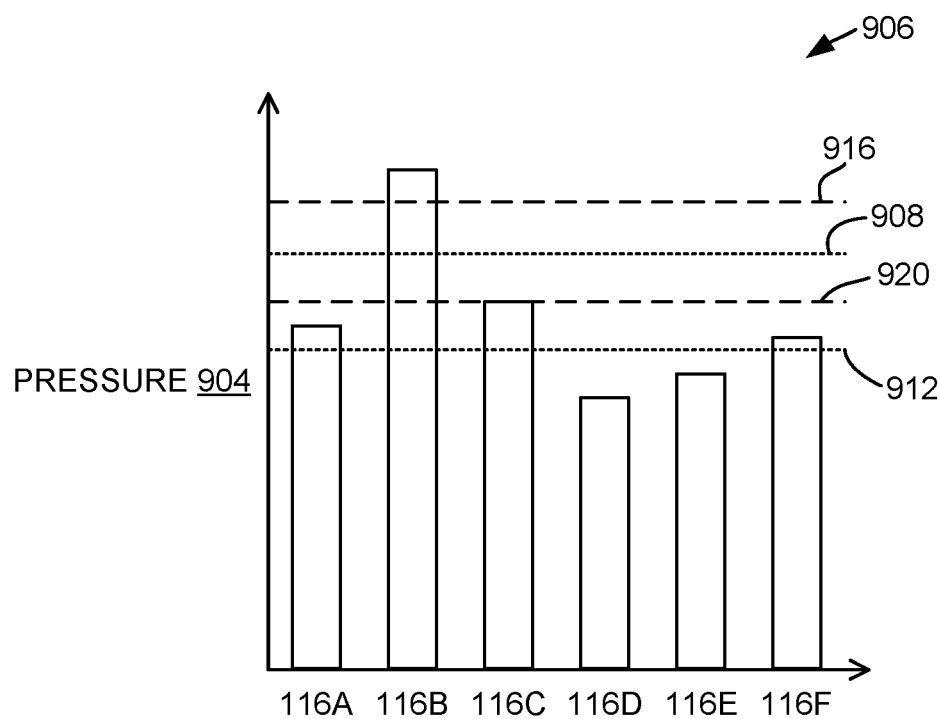

Likewise, the event termination threshold 912 may be adjusted to set a new event termination threshold 920 based on the initial pressure at one or more force-sensing elements 116. As illustrated by example in the pressure graph 906 of FIG. 11B, as the user removes pressure from the force-sensing element 116A and applies pressure to the neighboring force-sensing element 116B, the pressure applied to the neighboring force-sensing element 116B may exceed the new event initiation threshold 916, and the pressure applied to the force-sensing element 116A may drop below the new event termination threshold 920. In this manner, the transition between the force-sensing element 116A and the neighboring force-sensing element 116B may still register as a scrolling event, even though the pressure applied to the force-sensing element 116A may remain above the original event termination threshold 912.

With reference again to FIGS. 1 and 9 and as noted above, user input events generated via signals from the force-sensing elements 116 may be used to modify content displayed via a display device in a variety of manners. For example, modifying the content may comprise selecting or scrolling content displayed via the touch-screen display 108. In other examples, modifying the content may comprise highlighting, cutting, copying, and/or pasting text 136 or other suitable content.

Figure 12:
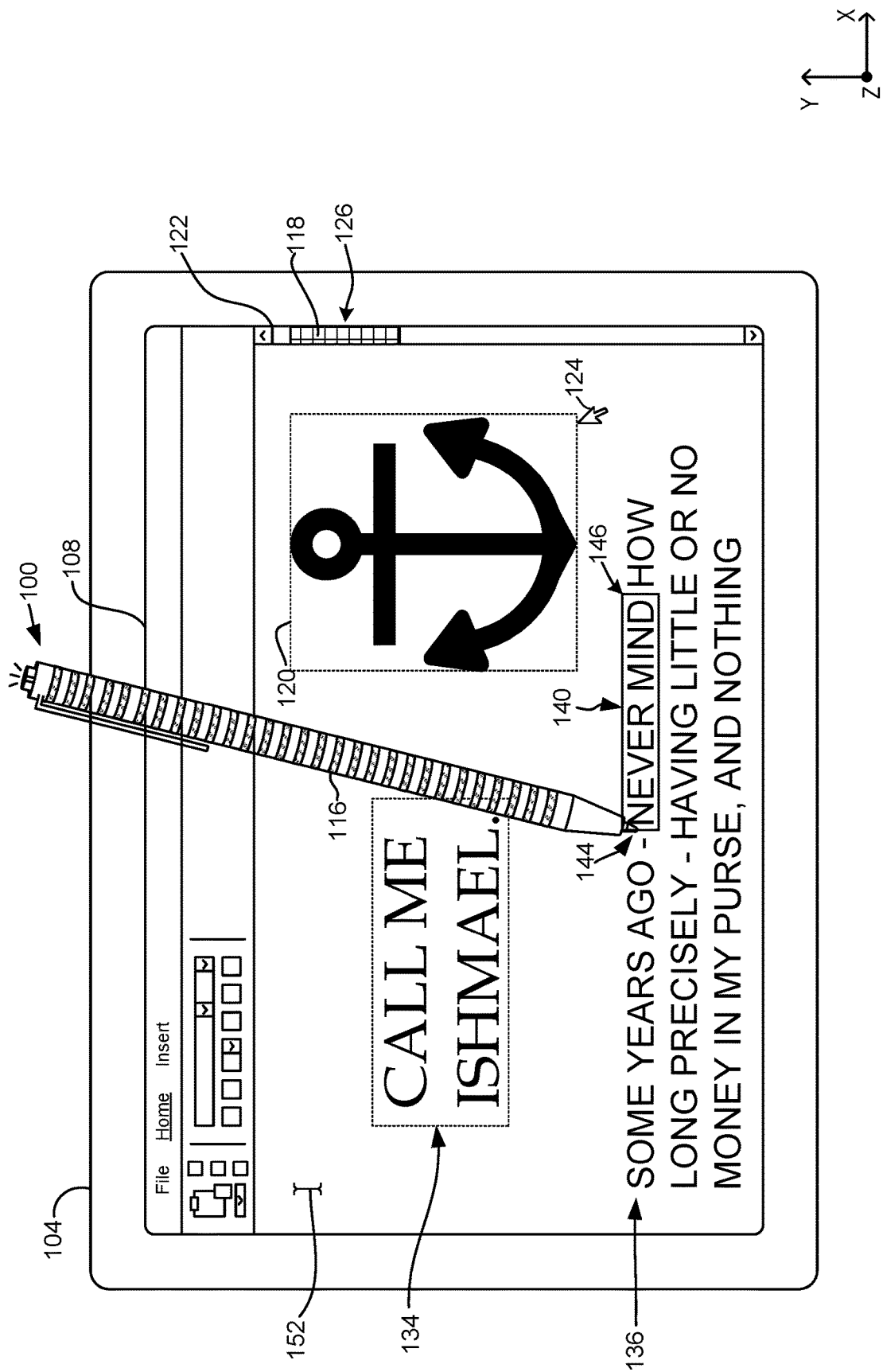
FIG. 12 shows an example of using a touch-sensitive input device to highlight displayed text according to examples of the present disclosure.

In one example, and with reference to FIG. 12, a portion 140 of the text 136 may be highlighted by selecting a start position 144 where the portion 140 of the text 136 is to begin. The start position 144 may be selected in any suitable manner, such as by touching the start position 144 on the touch-sensitive display 108 with a tip 148 of the electronic pen 100.

Once the start position 144 is selected, the user may provide scrolling input using the electronic pen 100 as described above with reference to FIGS. 5 and 6. The direction of the scrolling input may specify a direction in which to highlight the text. For example, the direction of the scrolling may indicate whether to highlight forwards or backwards in the text 136. The duration of the scrolling may indicate how much of the text is to be highlighted. For example, one scrolling event (e.g. transferring force from force-sensing 116A to force-sensing 116B in the example of FIG. 5) may be used to highlight one character, one word, one line, or any other suitable unit within the text 136. As shown in FIG. 12, the highlighting may stop at an end point 146 when the scrolling is terminated.

In some examples, scrolling or other suitable gestures may be used to cut, copy, or paste selected content. For example, after highlighting the portion 140 of the text 136, holding the pen 100 for a period of time without either (1) releasing pressure to terminate the scrolling event or (2) initiating a new scrolling event, may be interpreted by the computing device 104 as a command to copy the selected content.

Figure 13:
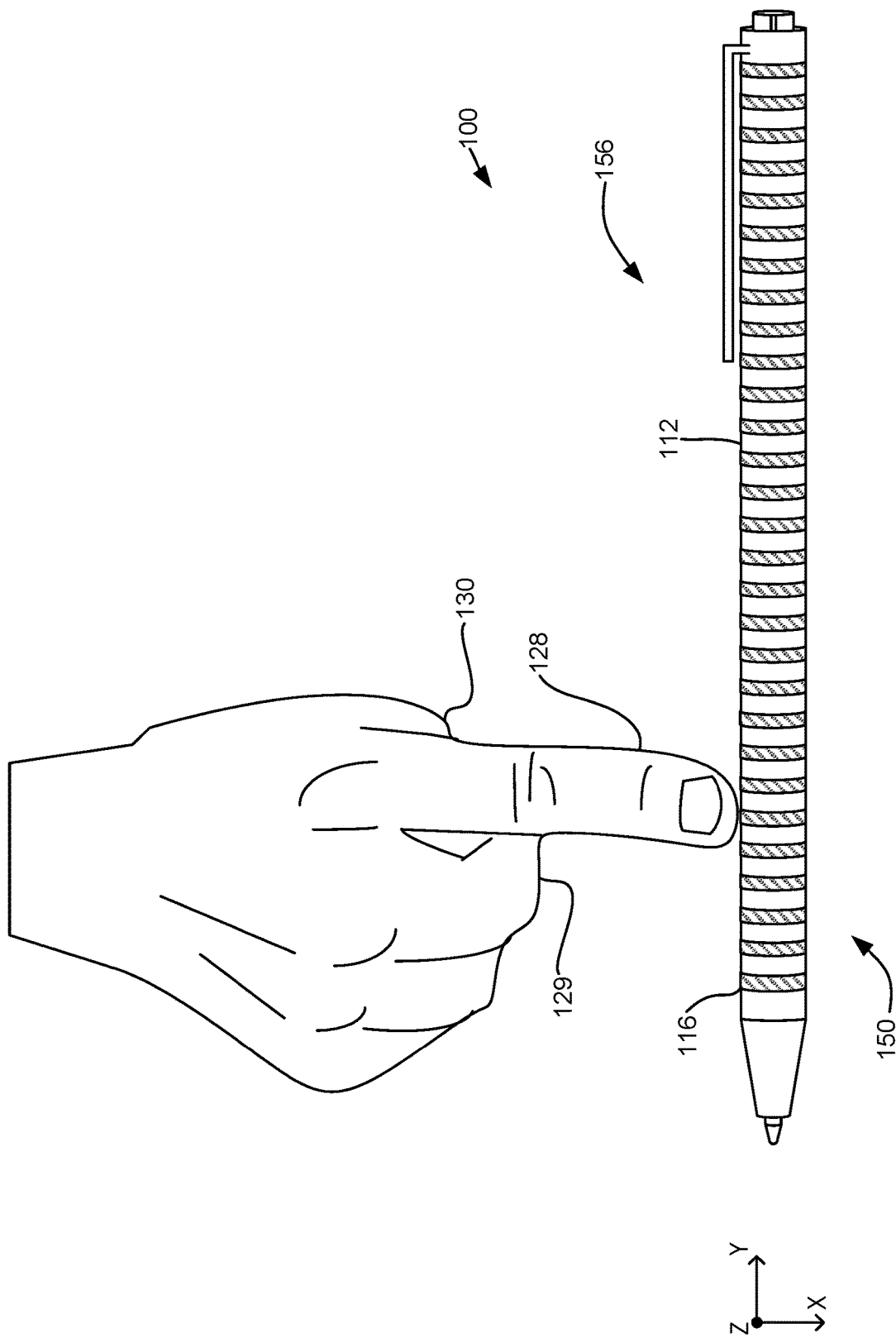
FIGS. 13 and 14 show an example of a user providing sliding input on the touch-sensitive input device of FIG. 1.
Figure 14:
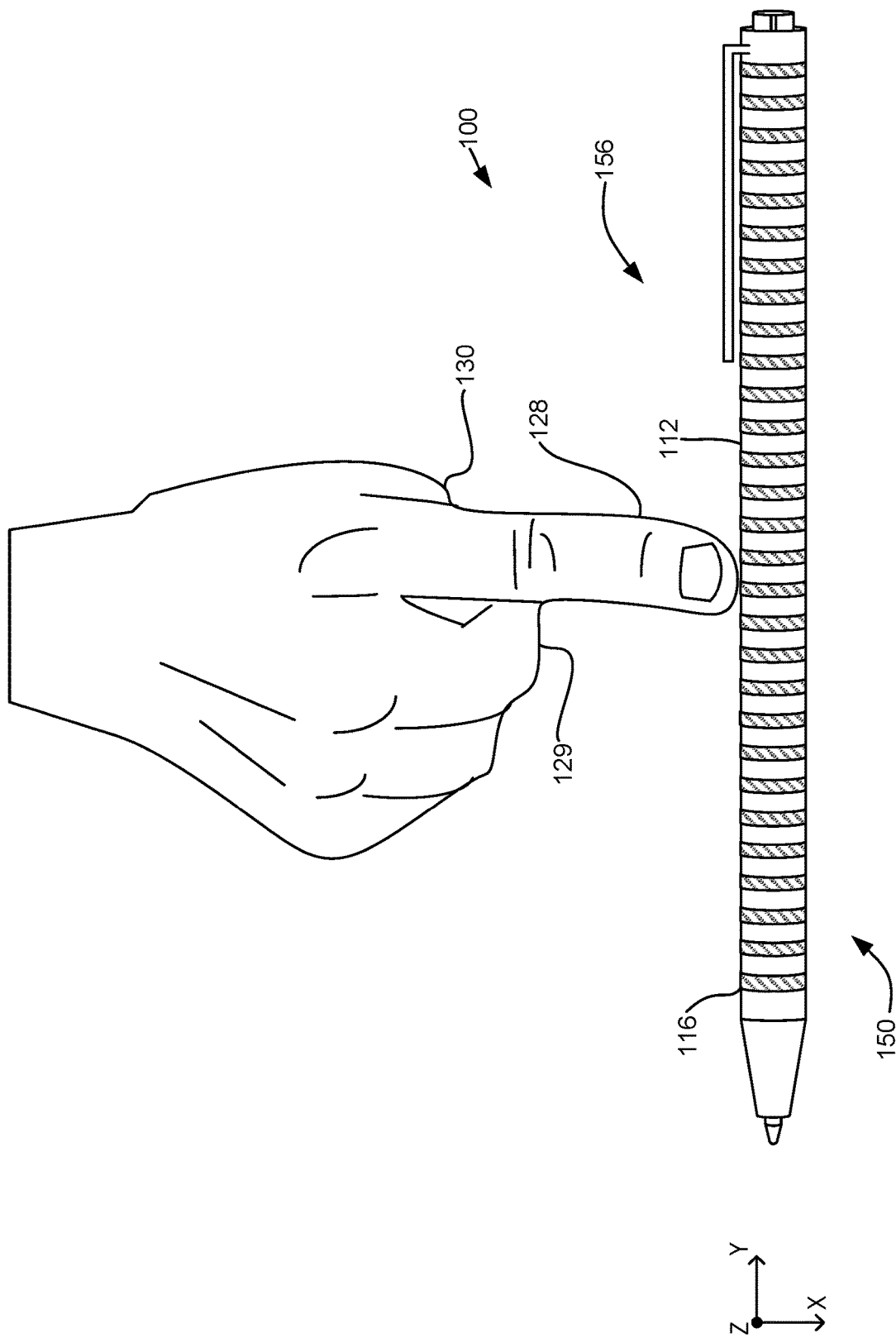

A user may provide other user inputs to specify whether the selected content is to be cut or copied, such as by tapping on the pen 100 before or after highlighting the portion 140 of the text 136 to specify that the portion 140 of the text 136 is to be cut. In other examples and as described above with reference to FIGS. 5 and 6, cutting or copying may be initiated by sliding the finger 128 in the positive y-axis direction from the writing grip portion 150 of the pen 100 towards the tail portion 156. With reference to FIG. 6 showing the user holding the pen 100 in a writing grip, sliding the finger 128 up the pen barrel in this manner may be similar to a natural motion used to pick up or take away items, which users may find intuitive or easy to remember. In this example, sliding the finger 128 up the pen barrel in this manner may cause the highlighted text 140 in FIG. 12 to be cut or copied to the clipboard. In another example and with reference to FIGS. 13 and 14, the user may touch and slide her finger 128 along force-sensing elements 116 in the positive y-axis direction to cause the highlighted text 140 in FIG. 12 to be cut or copied.

Figure 15:
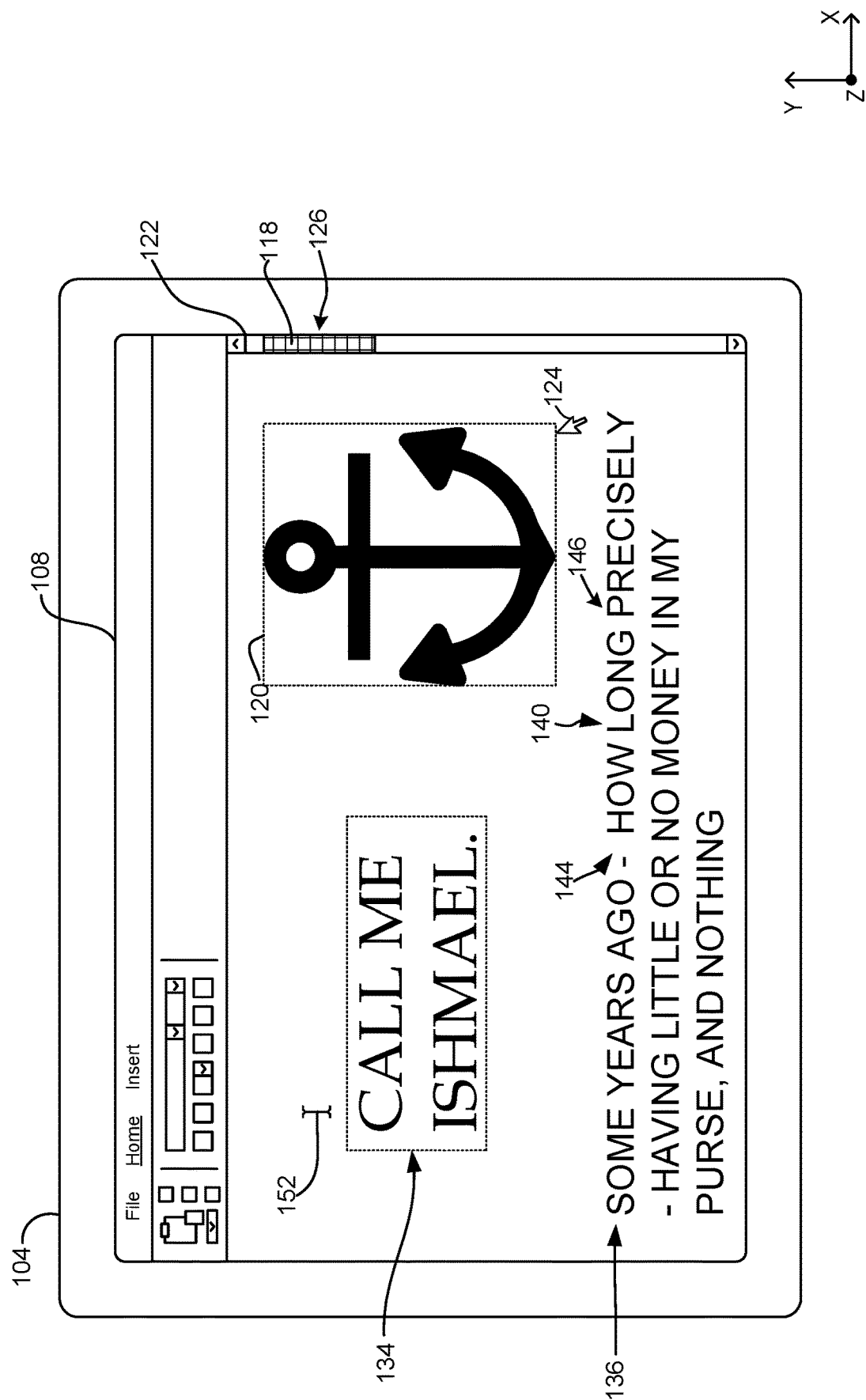
FIG. 15 shows the touch-sensitive display of FIG. 1 after a cut operation performed via a touch-sensitive input device according to examples of the present disclosure.

In other examples, the pen 100 may be used to paste the copied text or other clipboard content. In one example, the user may select a new location for the text. For example and with reference to FIG. 15, the user may select a new position indicated by a text cursor 152 by touching the touch-sensitive display 108 with the tip 148 of the electronic pen 100. To paste the cut or copied text, in some examples a sliding gesture in a direction opposite to the direction of the "cut" sliding gesture may be used to paste or "give back" copied content. For example and with reference again to FIG. 6, the user may press and slide the tip 135 of her finger in the negative y-axis direction to perform a paste operation.

Figure 16:
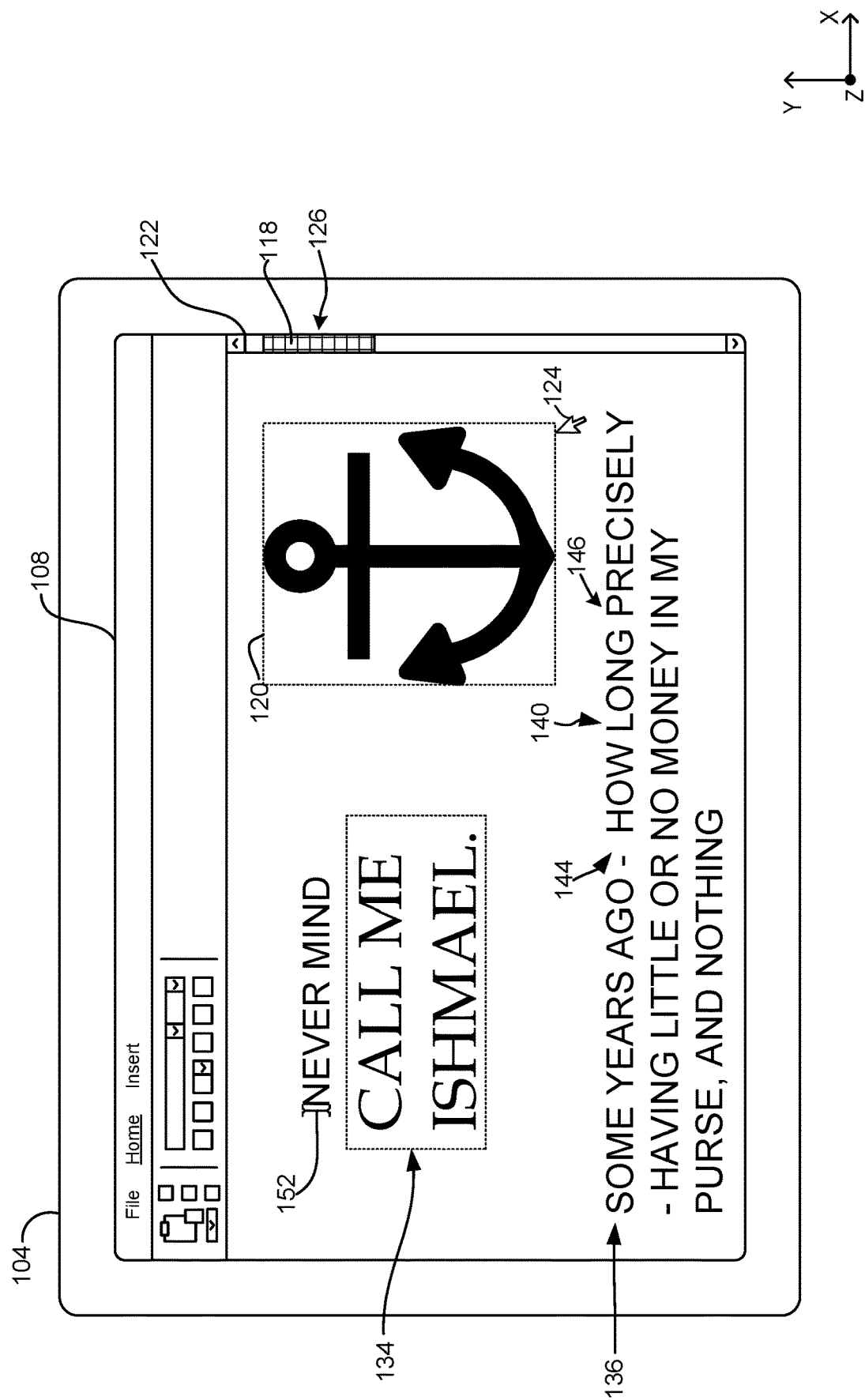
FIG. 16 illustrates an example of pasting text via a touch-sensitive input device according to examples of the present disclosure.

In other examples, a "double click" input provided on the pen 100 may be used to paste the content. With reference now to FIG. 16, such a paste operation causes the cut or copied text "NEVER MIND" to be displayed at the text cursor 152.

In some examples, a gesture or other user interaction with the force-sensing elements may produce different functions depending on the location of the gesture on the pen barrel. For example, and with reference to FIG. 5, a swipe or sliding gesture in a writing grip portion 150 of the pen 100 may produce a different user input event than the same swipe or sliding gesture in a tail portion 156 of the pen. For example, the sliding gesture 132 in the writing grip portion 150 of the pen 100 may result in a scrolling event, as described above. An otherwise identical sliding gesture 160 made in the tail portion 156 of the input device 100 may produce a different user input event.

Figure 17:
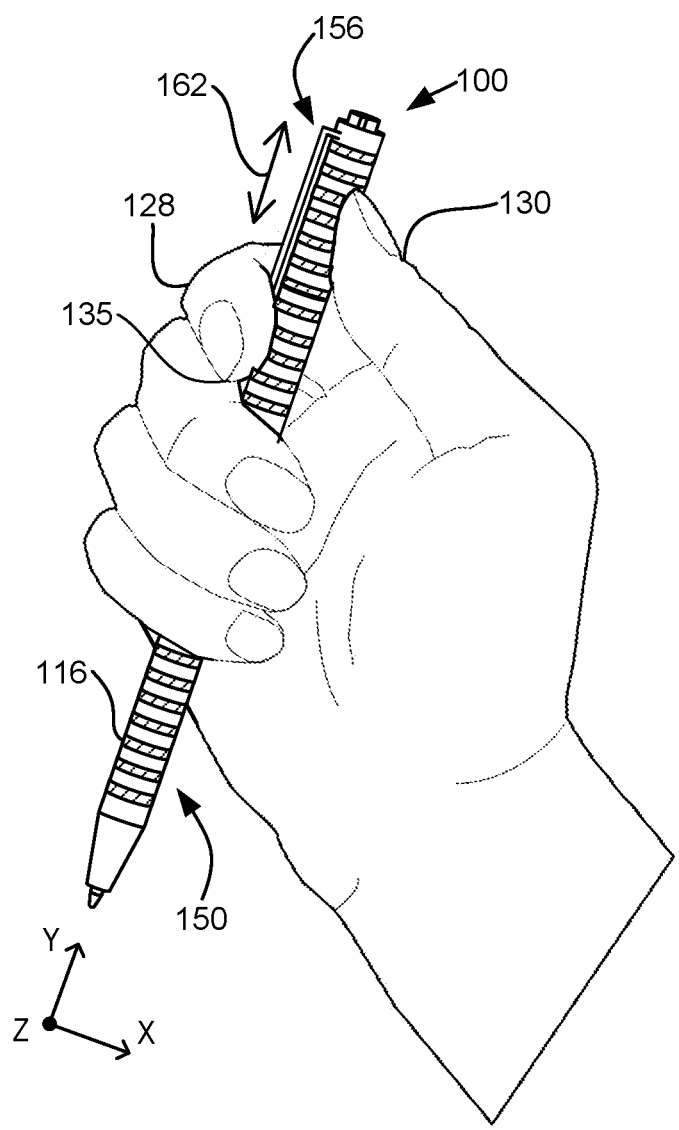
FIG. 17 illustrates yet another example of the user providing input at the touch-sensitive input device of FIG. 1.

In another example and with reference now to FIG. 17, the user may use thumb 130 to make a sliding gesture 162 in the tail region 156 of the pen while holding the pen in a fist. The sliding gesture 160 may produce a function selection event. In one example, the function selection event may comprise changing a color displayed by the display 108. For example, and with reference again to FIG. 12, the highlighted portion 140 of the text 136 may be highlighted in yellow by default. Making the sliding gesture 162 in the negative y-axis direction (e.g., from the tail toward the tip) may change the color of the highlighted portion 140 and/or the color of future highlighted portions of the text 136 (e.g. from yellow to pink or green) similar to switching between colors of physical highlighter pens. In other examples, the function selection event may comprise any range of functionalities and/or actions, such as changing the color of the clip art 120, opening a menu, making a selection, changing a color of a paintbrush within an application, etc.

In some examples, the electronic pen 100 may comprise one or more light emitting elements, such as a red-green-blue- (RGB)-emitting LED 164. In one example, the LED 164 may be configured to emit light 168 having a color that matches a color displayed via the touch-sensitive display 108, such as the color of the highlighted portion 140 of the text 136. In some examples, the LED 164 may be illuminated when a user input is detected to indicate a function that corresponds to the user input event, such as making a selection or scrolling. In other examples, the LED 164 may change colors to reflect a new color selected by the user via interactions with the pen 100. In some examples, the LED 164 may flash when a selection is made or while a user is scrolling.

It will also be appreciated that a user input event may be mapped to any suitable function. In some examples, gestures may be mapped based at least in part on a direction of the gesture. In one example, and with reference again to FIG. 5, a sliding gesture 160 made in the direction of the negative y-axis may be mapped to the function selection event. However, making the sliding gesture 160 in the opposite direction (the direction of the positive y-axis) may not result in a user input event. In other examples, the sliding gesture 160 in the tail portion 156 may be mapped to user input events in a binary manner, in which the user input events are unaffected by a length of the gesture.

It will also be appreciated that users may provide any suitable forms of input via the force-sensing elements of the electronic pen 100. Some examples of suitable inputs include tapping, swiping, scratching, and squeezing the device. In some examples, haptic feedback may be provided to accompany one or more of the inputs, and different forms of haptic feedback may be provided in response to different inputs.

In other examples, touch-sensitive input devices as described herein may be used to authenticate a user. Useful biometric information may be collected from a pattern of pressure exerted on the force-sensing elements. In the example of FIG. 2, when the user is holding the pen 200 in a writing grip (see FIG. 6), signals provided by the force-sensing elements 212 and 220 may be analyzed to generate a pressure pattern corresponding to a user's particular writing grip. In some examples, such a pressure pattern may indicate whether a user is left- or right-handed. The touch sensitive input device may additionally or alternatively include an accelerometer or IMU, which may provide additional information about the orientation and movement of the device from which characteristic patterns may be inferred for a particular user.

Such patterns may be associated with and used to identify a user. In some examples, the user's grip pattern may be determined by the location and pattern of pressure exerted on the force-sensing elements while the user is providing inputs via the pen 200. In some examples, a computing device may use one or more algorithms or other rules to recognize the user's grip pattern during one or more authenticated training sessions. For example, the tablet computing device 104, a computing device integrated into the electronic pen 100, or a remote server may implement one or more machine learning algorithms to recognize the user's grip pattern. force-sensing data collected during the one or more training sessions may be assembled into a profile, which may be compared to data collected in use to determine if a current user of the device matches the profile.

In some examples, these patterns may be checked continuously or periodically (e.g. once per 15 minutes) to re-authenticate a user after the user has been previously authenticated by another method, such as a login with a password. For example, the user may have previously signed into the tablet computing device 104. Rather than asking the user to sign into the device again, the currently-detected grip pattern may be compared to an authenticated grip pattern stored in a profile of the user to determine if the current grip pattern matches the user's authenticated grip pattern. If it does, then user inputs provided via the pen 200 may be designated as authentic inputs of the user for a safe period, such as 15 minutes. If the current grip pattern does not match the user's authenticated grip pattern, then the user is logged out of the current session and may be prompted to login again.

In another example, feedback may be provided to the user based on the user's grip pattern. For example, an educational application may monitor the grip pattern of a child who is learning how to write. The application may use this information to provide feedback on the user's grip, including whether the user is gripping the input device correctly or incorrectly. In this manner, the device may teach the child how to hold a pen or other writing instrument correctly.

Figure 18:
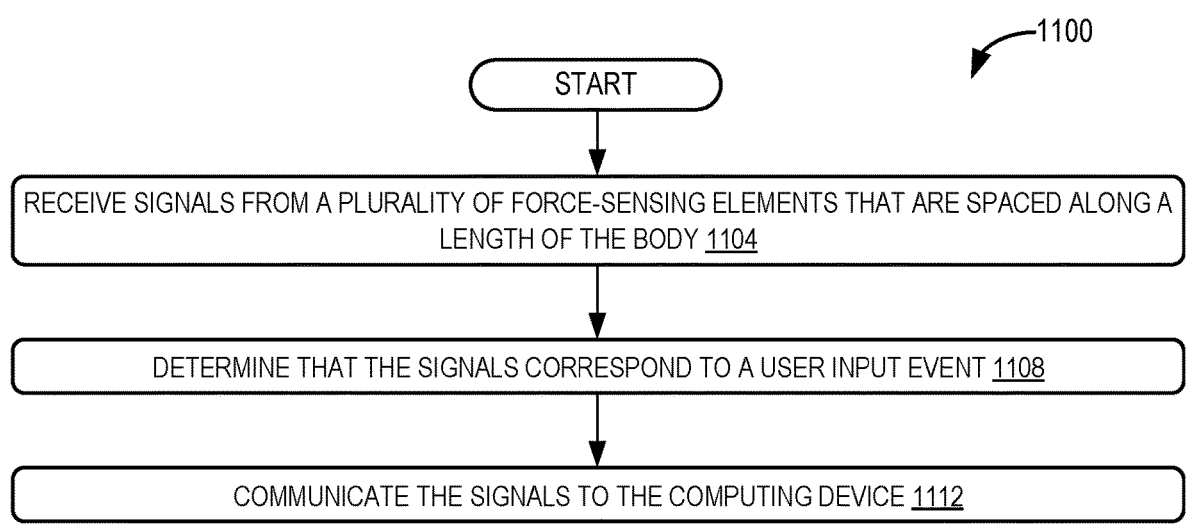
FIG. 18 is a flow chart of an example method for providing user input to a computing device communicatively coupled to a touch-sensitive user input device comprising an elongated body.

With reference now to FIG. 18, a flow chart is illustrated of an example method 1100 for providing user input to a computing device communicatively coupled to a touch-sensitive user input device comprising an elongated body. The following description of method 1100 is provided with reference to the software and hardware components described herein and shown in FIGS. 1-17 and 19. It will be appreciated that method 1100 also may be performed in other contexts using other suitable hardware and software components.

At 1104, the method 1100 includes receiving signals from a plurality of force-sensing elements that are spaced along a length of the body. At 1108, the method 1100 includes determining that the signals correspond to a user input event. At 1112, the method 1100 includes communicating the signals to the computing device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 19:
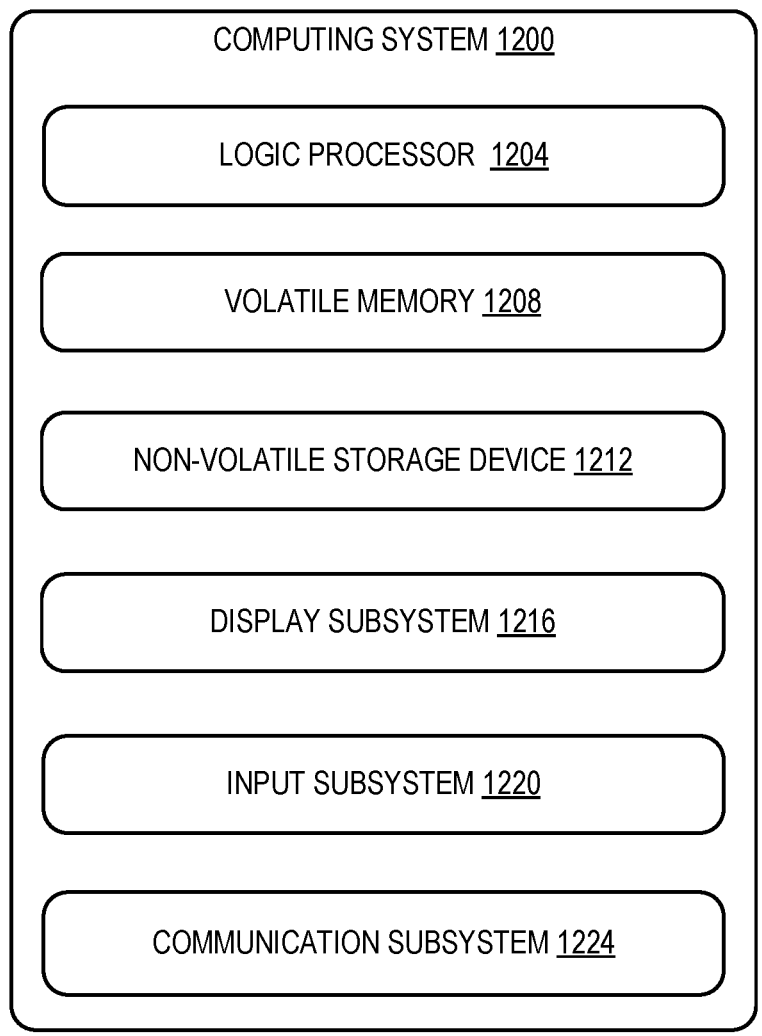
FIG. 19 shows a block diagram of a computing system according to examples of the present disclosure.

FIG. 19 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices. In the above examples, computing device 104 and electronic pens 100, 200, 400, and 800 may comprise computing system 1200 or one or more aspects of computing system 1200.

Computing system 1200 includes a logic processor 1204, volatile memory 1208, and a non-volatile storage device 1212. Computing system 1200 may optionally include a display subsystem 1216, input subsystem 1220, communication subsystem 1224 and/or other components not shown in FIG. 19.

Logic processor 1204 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1204 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1204 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 1208 may include physical devices that include random access memory. Volatile memory 1208 is typically utilized by logic processor 1204 to temporarily store information during processing of software instructions. It will be appreciated that volatile memory 1208 typically does not continue to store instructions when power is cut to the volatile memory 1208.

Non-volatile storage device 1212 includes one or more physical devices configured to hold instructions executable by the logic processors to implement the methods and processes described herein. When such methods and processes are implemented, the state of non-volatile storage device 1212 may be transformed—e.g., to hold different data.

Non-volatile storage device 1212 may include physical devices that are removable and/or built-in. Non-volatile storage device 1212 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1212 may include nonvolatile, dynamic, static, read/write, read-only, sequential-access, location-addressable, file-addressable, and/or content-addressable devices. It will be appreciated that non-volatile storage device 1212 is configured to hold instructions even when power is cut to the non-volatile storage device 1212.

Aspects of logic processor 1204, volatile memory 1208, and non-volatile storage device 1212 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1200 typically implemented in software by a processor to perform a particular function using portions of volatile memory, which function involves transformative processing that specially configures the processor to perform the function. Thus, a program or application may be instantiated via logic processor 1204 executing instructions held by non-volatile storage device 1212, using portions of volatile memory 1208. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1216 may be used to present a visual representation of data held by non-volatile storage device 1212. As the herein described methods and processes change the data held by the non-volatile storage device, and thus transform the state of the non-volatile storage device, the state of display subsystem 1216 may likewise be transformed to visually represent changes in the underlying data. Display subsystem 1216 may include one or more display devices utilizing virtually any type of technology. Such display devices may be combined with logic processor 1204, volatile memory 1208, and/or non-volatile storage device 1212 in a shared enclosure, or such display devices may be peripheral display devices.

When included, input subsystem 1220 may comprise or interface with the force-sensing elements described herein and/or one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1224 may be configured to communicatively couple various computing devices described herein with each other, and with other devices. Communication subsystem 1224 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1200 to send and/or receive messages to and/or from other devices via a network such as the Internet.

The following paragraphs provide additional support for the claims of the subject application. One aspect provides a touch-sensitive input device configured to communicatively couple to a computing device, the touch-sensitive input device comprising: an elongated body; a plurality of force-sensing elements spaced along a length of the body; and a wireless communication subsystem that is configured to communicatively couple the input device to the computing device and provide signals from the plurality of force-sensing elements to the computing device. The touch-sensitive input device may additionally or alternatively include, wherein each force-sensing element of the plurality of force-sensing elements extends entirely around a circumference of the body. The touch-sensitive input device may additionally or alternatively include, wherein two or more of the force-sensing elements extend around coplanar portions of a circumference of the body.

The touch-sensitive input device may additionally or alternatively include, wherein the plurality of force-sensing elements comprises a plurality of individual force-sensing elements distributed in an array around a circumference and along at least a portion of the length of the body. The touch-sensitive input device may additionally or alternatively include, wherein the plurality of force-sensing elements are uniformly spaced along the body. The touch-sensitive input device may additionally or alternatively include an actuator for providing haptic feedback to a user of the touch-sensitive input device.

Another aspect provides a system, comprising: a computing device comprising: a touch-sensitive display, a processor, and a memory storing instructions executable by the processor to display content via the touch-sensitive display; and a touch-sensitive input device configured to communicatively couple to the computing device, the touch-sensitive input device comprising: an elongated body, a plurality of force-sensing elements spaced along a length of the body, and a wireless communication subsystem that is configured to communicatively couple the input device to the computing device and provide signals from the plurality of force-sensing elements to the computing device.

The system may additionally or alternatively include, wherein the instructions are further executable to: receive a signal from one of the force-sensing elements of the plurality of force-sensing elements; use at least the signal to determine that a pressure applied to the one force-sensing element exceeds an event initiation threshold; and based on determining that the pressure exceeds the event initiation threshold, modify the content displayed by the touch-sensitive display.

The system may additionally or alternatively include, wherein modifying the content comprises selecting a portion of the content displayed via the touch-sensitive display. The system may additionally or alternatively include, wherein modifying the content comprises scrolling the content displayed via the touch-sensitive display.

The system may additionally or alternatively include, wherein the pressure is an initial pressure, and the instructions are further executable to: receive a signal from a neighboring force-sensing element adjacent to the one force-sensing element; determine that a neighboring pressure applied to the neighboring force-sensing element exceeds the event initiation threshold; determine that a subsequent pressure applied to the one force-sensing element is below an event termination threshold; and based on (1) determining that the neighboring pressure applied to the neighboring force-sensing element exceeds the event initiation threshold and (2) determining that the subsequent pressure applied to the one force-sensing element is below the event termination threshold, modify the content displayed by the touch-sensitive display.

The system may additionally or alternatively include, wherein the instructions are further executable to determine that a scrolling event has occurred based on (1) determining that the neighboring pressure applied to the neighboring force-sensing element exceeds the event initiation threshold and (2) determining that the subsequent pressure applied to the one force-sensing element is below the event termination threshold.

The system may additionally or alternatively include, wherein the instructions are further executable to determine that the scrolling event has occurred in a direction from the one force-sensing element to the neighboring force-sensing element based on (1) determining that the neighboring pressure applied to the neighboring force-sensing element exceeds the event initiation threshold and (2) determining that the subsequent pressure applied to the one force-sensing element is below the event termination threshold.

The system may additionally or alternatively include, wherein the instructions are further executable to determine that the scrolling event has occurred based on determining that both (1) determining that the neighboring pressure applied to the neighboring force-sensing element exceeds the event initiation threshold and (2) determining that the subsequent pressure applied to the one force-sensing element is below the event termination threshold happened within a predefined period of time.

The system may additionally or alternatively include, wherein the instructions are further executable to provide haptic feedback for each scrolling event that occurs. The system may additionally or alternatively include, wherein the instructions are further executable to set the event initiation threshold based on an initial pressure exerted on a portion of the plurality of force-sensing elements.

The system may additionally or alternatively include, wherein the touch-sensitive input device comprises a tip portion and a tail portion, and the instructions are further executable to: when the one force-sensing element is within the tip portion, modify the content displayed by the touch-sensitive display in a first manner; and when the one force-sensing element is within the tail portion, modify the content in a second manner different from the first manner.

The system may additionally or alternatively include, wherein the touch-sensitive input device comprises a light emitting element, and the instructions are further executable to, based on determining that the pressure exceeds the event initiation threshold, illuminate the light emitting element to indicate a function that corresponds to the pressure exceeding the event initiation threshold. The system may additionally or alternatively include, wherein the instructions are further executable to: use signals from at least a portion of the plurality of force-sensing elements to generate a pressure pattern; and compare the pressure pattern to an authenticated grip pattern to authenticate a user.

Another aspect provides, at a touch-sensitive user input device comprising an elongated body, a method for providing user input to a computing device communicatively coupled to the touch-sensitive user input device, the method comprising: receiving signals from a plurality of force-sensing elements that are spaced along a length of the body; determining that the signals correspond to a user input event; and communicating the signals to the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive input device configured to communicatively couple to a computing device, the touch-sensitive input device comprising:
    an elongated body;
    a plurality of force-sensing elements spaced along a length of the body;
    a processor;
    a memory storing instructions executable by the processor; and
    a wireless communication subsystem that is configured to communicatively couple the input device to the computing device,
    wherein the instructions are executable by the processor to:
        determine that a first pressure applied to a first force-sensing element of the plurality of force-sensing elements exceeds an event initiation threshold;
        based on determining that the first pressure exceeds the event initiation threshold, trigger a user input event that causes a first modification of content displayed by the computing device;
        adjust the event initiation threshold to an adjusted event initiation threshold, wherein adjusting the event initiation threshold to the adjusted event initiation threshold comprises computing an average initial pressure value using at least the first pressure exerted on the first force-sensing element and another pressure exerted on another force-sensing element, and adding the average initial pressure value to the event initiation threshold;
        determine that a second pressure applied to a second force-sensing element of the plurality of force-sensing elements exceeds the adjusted event initiation threshold; and
        based on determining that the second pressure exceeds the adjusted event initiation threshold, trigger another user input event that causes a second modification of content displayed by the computing device.

2. The touch-sensitive input device of claim 1, wherein each force-sensing element of the plurality of force-sensing elements extends entirely around a circumference of the body.

3. The touch-sensitive input device of claim 1, wherein two or more of the force-sensing elements extend around coplanar portions of a circumference of the body.

4. The touch-sensitive input device of claim 1, wherein the plurality of force-sensing elements comprises a plurality of individual force-sensing elements distributed in an array around a circumference and along at least a portion of the length of the body.

5. The touch-sensitive input device of claim 1, wherein the plurality of force-sensing elements are uniformly spaced along the body.

6. The touch-sensitive input device of claim 1, further comprising an actuator for providing haptic feedback to the user of the touch-sensitive input device.

7. A system, comprising:
    a computing device comprising:
        a touch-sensitive display,
        a processor, and
        a memory storing instructions executable by the processor to display content via the touch-sensitive display; and
    a touch-sensitive input device configured to communicatively couple to the computing device, the touch-sensitive input device comprising:
        an elongated body,
        a plurality of force-sensing elements spaced along a length of the body, and
        a wireless communication subsystem that is configured to communicatively couple the input device to the computing device and provide signals from the plurality of force-sensing elements to the computing device;
    wherein the instructions are further executable by the processor of the computing device to:
        determine that a first pressure applied to a first force-sensing element of the plurality of force-sensing elements exceeds an event initiation threshold;
        based on determining that the first pressure exceeds the event initiation threshold, trigger a user input event that causes a first modification of content displayed by the computing device;
        adjust the event initiation threshold to an adjusted event initiation threshold, wherein adjusting the event initiation threshold to the adjusted event initiation threshold comprises computing an average initial pressure value using at least the first pressure exerted on the first force-sensing element and another pressure exerted on another force-sensing element, and adding the average initial pressure value to the event initiation threshold;

determine that a second pressure applied to a second force-sensing element of the plurality of force-sensing elements exceeds the adjusted event initiation threshold; and based on determining that the second pressure exceeds the adjusted event initiation threshold, trigger another user input event that causes a second modification of content displayed by the computing device.

8. The system of claim 7, wherein causing the first modification of content displayed by the touch-sensitive display comprises scrolling the content displayed via the touch-sensitive display.

9. The system of claim 7, wherein causing the second modification of content displayed by the touch-sensitive display comprises selecting a portion of the content displayed via the touch-sensitive display.

10. The system of claim 7, wherein the instructions are further executable to determine that a scrolling event has occurred in a direction from one force- sensing element of a first pair of neighboring force-sensing elements to a neighboring force-sensing element of the first pair of neighboring force-sensing elements based on (1) determining that a neighboring pressure applied to the neighboring force-sensing element exceeds the event initiation threshold and (2) determining that a subsequent pressure applied to the one force-sensing element is below an event termination threshold.

11. The system of claim 7, wherein the instructions are further executable to provide haptic feedback for each scrolling event that occurs.

12. The system of claim 7, wherein the touch-sensitive input device comprises a tip portion and a tail portion, and the instructions are further executable to:

when one force-sensing element of a first pair of neighboring force-sensing elements is within the tip portion, modify the content displayed by the touch-sensitive display in a first manner; and when the one force-sensing element is within the tail portion, modify the content in a second manner different from the first manner.

13. The system of claim 7, wherein the touch-sensitive input device comprises a light emitting element, and the instructions are further executable to, based on determining that a pressure applied to one of the plurality of force-sensing elements exceeds the event initiation threshold, illuminate the light emitting element to indicate a function that corresponds to the pressure exceeding the event initiation threshold.

14. The system of claim 7, wherein the instructions are further executable to:

use signals from at least a portion of the plurality of force-sensing elements to generate a pressure pattern; and compare the pressure pattern to an authenticated grip pattern to authenticate the user.

15. At a touch-sensitive user input device comprising an elongated body and a plurality of force-sensing elements that are spaced along a length of the body, a method for providing user input to a computing device communicatively coupled to the touch-sensitive user input device, the method comprising:

determining that a first pressure applied to a first force-sensing element of the plurality of force-sensing elements exceeds an event initiation threshold;

based on determining that the first pressure exceeds the event initiation threshold, triggering a user input event that causes a first modification of content displayed by the computing device;

adjusting the event initiation threshold to an adjusted event initiation threshold, wherein adjusting the event initiation threshold to the adjusted event initiation threshold comprises computing an average initial pressure value using at least the first pressure exerted on the first force-sensing element and another pressure exerted on another force-sensing element, and adding the average initial pressure value to the event initiation threshold;

determining that a second pressure applied to a second force-sensing element of the plurality of force-sensing elements exceeds the adjusted event initiation threshold; and based on determining that the second pressure exceeds the adjusted event initiation threshold, triggering another user input event that causes a second modification of content displayed by the computing device.

* * * * *